(12) United States Patent
Chen et al.

(10) Patent No.: US 7,818,450 B2
(45) Date of Patent: Oct. 19, 2010

(54) METHOD FOR SELECTING REAL-TIME SERVICE DATA TRANSMISSION PATH

(75) Inventors: Yuepeng Chen, Shenzhen (CN); Lingyuan Fan, Shenzhen (CN); Dengchao Wu, Shenzhen (CN); Bo Xu, Shenzhen (CN); Bo Xu, Shenzhen (CN); Shaoshuai Sui, Shenzhen (CN); Jianzhong Huang, Shenzhen (CN); Wu Qing, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 769 days.

(21) Appl. No.: 10/570,477

(22) PCT Filed: Sep. 2, 2004
(Under 37 CFR 1.47)

(86) PCT No.: PCT/CN2004/001015
§ 371 (c)(1),
(2), (4) Date: May 11, 2007

(87) PCT Pub. No.: WO2005/022824
PCT Pub. Date: Mar. 10, 2005

(65) Prior Publication Data
US 2008/0130627 A1    Jun. 5, 2008

(30) Foreign Application Priority Data

| Sep. 2, 2003 | (CN) | ............... 03 1 56162 |
| Sep. 2, 2003 | (CN) | ............... 03 1 56163 |
| Sep. 2, 2003 | (CN) | ............... 03 1 57639 |
| Sep. 2, 2003 | (CN) | ............... 03 1 57640 |
| Sep. 10, 2003 | (CN) | ............... 03 1 59179 |
| Sep. 16, 2003 | (CN) | ............... 03 1 57145 |
| Sep. 18, 2003 | (CN) | ............... 03 1 57329 |
| Sep. 27, 2003 | (CN) | ............... 03 1 26411 |
| Dec. 24, 2003 | (CN) | ............... 2003 1 0113001 |
| Apr. 1, 2004 | (CN) | ............... 2004 1 0030941 |

(51) Int. Cl.
*G06F 15/16*    (2006.01)
*H04L 12/28*    (2006.01)
*H04L 12/56*    (2006.01)

(52) U.S. Cl. .............. 709/238; 370/351; 370/395.21

(58) Field of Classification Search ............. 709/238; 370/351, 395.21
See application file for complete search history.

(56) References Cited

U.S. PATENT DOCUMENTS

| 6,104,802 | A | 8/2000 | Perlmutter | |
| 6,470,080 | B2 | 10/2002 | Perlmutter | |
| 6,584,093 | B1 | 6/2003 | Salama et al. | |
| 6,614,765 | B1 | 9/2003 | Bruno et al. | |
| 2001/0027484 | A1 | 10/2001 | Nishi | |
| 2001/0029547 | A1 | 10/2001 | Kano et al. | |
| 2002/0037076 | A1 | 3/2002 | Perlmutter | |
| 2002/0120749 | A1* | 8/2002 | Widegren et al. | ......... 709/227 |
| 2002/0169887 | A1* | 11/2002 | MeLampy et al. | ......... 709/231 |
| 2003/0026268 | A1* | 2/2003 | Navas | ......... 370/400 |
| 2003/0076816 | A1 | 4/2003 | Naranjo et al. | |
| 2003/0103510 | A1 | 6/2003 | Svanberg et al. | |
| 2003/0128710 | A1 | 7/2003 | Fedyk et al. | |

FOREIGN PATENT DOCUMENTS

| CN | 1282484 | 1/2001 |
| CN | 1282484 A | 1/2001 |
| EP | 0 915 594 A2 | 5/1999 |
| EP | 0915594 | 5/1999 |
| JP | 07-095207 | 4/1995 |
| JP | 8-237277 | 9/1996 |
| JP | 10-247915 | 9/1998 |
| JP | 2000-115242 | 4/2000 |
| JP | 2000115242 | 4/2000 |
| JP | 2001-292165 | 10/2001 |
| JP | 2002-124976 | 4/2002 |
| JP | 2002-319970 | 10/2002 |
| JP | 2002-374294 | 12/2002 |
| JP | 2002-374299 | 12/2002 |
| JP | 2003-531519 | 10/2003 |
| JP | 2005-502275 T | 1/2005 |
| WO | WO 03/021888 A1 | 3/2003 |

| WO | WO 03/069858 A2 | 8/2003 |

OTHER PUBLICATIONS

International Search Report, dated Dec. 30, 2004, corresponding to PCT/CN2004/001015.

Japanese Office action dated Feb. 20, 2009, for corresponding Japanese application 2006-525027, noting listed references in this IDS.

Okumus, I.T., et al., *Inter-Domain LSP Setup Using Bandwidth Management Points,* IEEE Global Telecommunications Conference, San Antonio, Texax, Nov. 25-29, 2001. vol. 1, Nov. 25, 2001, pp. 7-11, XP 001090208.

El-Darieby, M., et al., *A Hierarchical Distributed Protocol for MPLS Path Creation,* Computers and Communications, Seventh International Symposium, Jul. 1-4, 2002, pp. 920-926, XP 010595868.

*Digital Broadband Cable Access to the Public Telecommunications Network; IP Multimedia Time Critical Services; Part 17: Inter-domain Quality of Service,* ETSI Standards, European Telecommunications Standards Intitute, vol. AT-Digital, No. V111, Feb. 2002, XP014006819.

*Telecommunications and Internet Protocol Harmonization Over Networks (TIPHON); Signalling for basic calls from an H.323 terminal to a terminal in a Switched-Circuit Network (SCN),* ETSI Standards, European Telecommunications Standards Intitute, vol. TIPHON-3, No. V164, Dec. 1998, XP014006043.

*QoS routing and related traffic engineering methods—Call routing and connection routing methods,* ITU-T Standard in Force (I), International Telecommunication Union, Geneva, CH, No. E3602 5/2, May 16, 2002, XP017400334.

Partial European Search Report dated Sep. 28, 2006, for EP 04762150.3, in the name of Huawei Technologies Co., Ltd.

European Search Report dated Dec. 6, 2006, for EP 04762150.3, in the name of Huawei Technologies Co., Ltd.

European Office action dated Jan. 2, 2007, for EP 04762150.3, in the name of Huawei Technologies Co., Ltd.

European Office action dated Aug. 21, 2007, for EP 04762150.3, in the name of Huawei Technologies Co., Ltd.

English Abstract of CN 1282484, Published Jan. 31, 2001, previously filed as "On Order".

English Abstract of JP 2000-115242, Published Apr. 21, 2000, previously filed as "On Order".

\* cited by examiner

*Primary Examiner* — George C Neurauter, Jr.
*Assistant Examiner* — Mark D Fearer
(74) *Attorney, Agent, or Firm* — Slater & Matsil, L.L.P.

(57) ABSTRACT

The present invention discloses a method for selecting a real-time service data transmission path, comprising establishing an independent bearer control layer comprising more than one bearer network resource manager between a service control layer and a bearer network. The method further comprises: after a source bearer network resource manager which is connected to the service control layer receives a connection request for a real-time service, orderly selecting and determining, from the source bearer network resource manager towards a destination bearer network resource manager, an intra-domain route path for the real-time service in a management domain corresponding to each bearer network resource manager, and an inter-domain route path between adjacent management domains corresponding to adjacent bearer network resource managers. In addition, the present invention discloses six methods for selecting a real-time service data transmission path based on different strategies. The methods according to the present invention can increase success ratio of routing, and can obtain an optimal route in simple and flexible manners, thus can guarantee reasonable allocation of resources.

27 Claims, 16 Drawing Sheets

| bit | 0 | 4 | 8 | 16 | 19 | 24 | 31 |
|---|---|---|---|---|---|---|---|
| | version | head length | service type | | total length | | |
| | identifier | | | symbol | field shift | | |
| | lifespan | | protocol | head check sum | | | |
| | IP address of source station | | | | | | |
| | IP address of destination station | | | | | | |
| | optional field with changeable length | | | | | fill in | |
| | data | | | | | | |
| | ... | | | | | | |

Fig.18

METHOD FOR SELECTING REAL-TIME SERVICE DATA TRANSMISSION PATH

CROSS-REFERENCE TO RELATED APPLICATIONS

The present application is a National Phase Patent Application of International Application Number PCT/CN2004/001015, filed on Sep. 2, 2004, which claims priority from Chinese Patent Application No. 03156163.2 filed on Sep. 2, 2003; Chinese Patent Application No. 03156162.4 filed on Sep. 2, 2003; Chinese Patent Application No. 03157640.0 filed on Sep. 2, 2003; Chinese Patent Application No. 03157639.7 filed on Sep. 2, 2003; Chinese Patent Application No. 03159179.5 filed on Sep. 10, 2003; Chinese Patent Application No. 03157145.X filed on Sep. 16, 2003; Chinese Patent Application No. 03157329.0 filed on Sep. 18, 2003; Chinese Patent Application No. 03126411.5 filed on Sep. 27, 2003; Chinese Publication No. 200310113001.9 filed on Dec. 24, 2003; and Chinese Publication No. 200410030941.6 filed on Apr. 1, 2004 the contents of which are incorporated herein by reference.

FIELD OF THE TECHNOLOGY

The present invention relates to routing selection technique, more particularly to a method for selecting and determining a real-time service data transmission path in an IP network.

BACKGROUND OF THE INVENTION

With developing of the Internet, various network services and advanced multimedia systems have been proposed. Since a real-time service is sensitive to some functions such as network transmission delay and delay jitter, when there are services like File Transfer Protocol (FTP) with high burst quality or Hyper Text Transfer Protocol (HTTP) with image files etc., real-time services will be greatly affected. In addition, since multimedia services occupy a wide range of bandwidths, the critical services to be guaranteed cannot be transmitted reliably in the prior networks. Therefore, in order to guarantee reliable transmission for the critical services, various Quality of Service (QoS) techniques have been proposed. Internet Engineering Task Force (IETF) has put forward many service models and mechanisms for QoS requirements. At present, a fairly recognized technique in the art is to adopt Integrated Service (Int-Serv) model in access area or edge area of a network, while to adopt Differentiated Service (Diff-Serv) model in core area of the network.

The Diff-Serv model guarantees QoS only by setting priorities, which makes actual effect unpredictable though the line utilization ratio is high. Therefore, an independent bearer control layer is introduced for the Dif-Serv model of a backbone network, a dedicated Diff-Serve QoS signaling mechanism is established and a dedicated resource management layer for managing topology resources of the network is established for Diff-Serv network. Such resource managing Diff-Service mode is called Diff-Service model with independent bearer control layer. FIG. 1 illustrates such a model of a Diff-Service model with independent bearer control layer. As shown in FIG. 1, a bearer control layer 102 is located between a bearer network 103 and a service control layer 101 in this model. A Call Agent (CA) in service control layer 101 is a service server, such as a soft switch which can implement soft switch function. Bearer control layer 102 includes one or more than one bearer network resource manager, which is in charge of configuring management rules and network topology, assigning resource allocation for a client's service bandwidth request, controlling and managing all bearer network resource managers to transfer the client's service bandwidth application request and result as well as the route path information allocated for service application in between by way of signaling, for example, controlling and managing communications among bearer network resource managers 1, 2 and 3. In bearer network 103, each bearer network resource manager manages a given bearer network area which is called management domain of corresponding bearer network resource manager, for example, bearer network resource manager 1 manages management domain 105, bearer network resource manager 2 manages management domain 106 and bearer network resource manager 3 manages management domain 107. Bearer network 103 includes an Edge Router (ER), a Border Router (BR) and a core router 104, the ER, BR and core router all belonging to the bearer network and generally called Connection Nodes (CNs).

The bearer control layer will determine a path for a user service when processing the user's service bandwidth application, and the bearer network resource manager will notify ER to forward service stream according to the specified path. Routes in a bearer network resource manager include two types: signaling route and service route. The signaling route means a procedure of how each bearer network resource manager finds the next hop of bearer network resource manager. The service route means a procedure of how a bearer network resource manager finds a proper bearer Label Switching Path (LSP) according to service stream information. A service route comprises an intra-domain route and an inter-domain route.

Generally speaking, the bearer network forwards user service streams with a specified route according to the path determined by the bearer control layer. At present, an LSP is established along the service stream path specified by the bearer control layer by way of resource reservation manner, by utilizing Multi-Protocol Label Switching (MPLS) technique, or an end to end LSP is established by utilizing explicit route mechanism based on Resource ReSerVation Setup Protocol with Traffic Engineering extensions (RSVP-TE) or Constraint Route Label Distribution Protocol (CR-LDP).

At present, there are several schemes for route path establishment and resource allocation of a bearer network resource manager as follows:

One scheme is a technique of establishing route path on requirement, namely when a calling party initiates a call, a bearer network resource manager acquires LSP information real-timely from a router of a bearer network according to the current network topology and management rule, selects an LSP suitable for the current call from the LSP information, and releases this LSP after the current call is finished. In this scheme, because a bearer network resource manager acquires LSP information directly from a bearer network and it is required to reacquire and reselect corresponding LSP for each call, LSP information cannot be repeatedly used, which results in high routing load and low efficiency of a bearer network resource manager.

Another scheme utilizes bandwidth broker model of a Quality-of-Service backbone (QBone) experimental network. Its network structure model is shown in FIG. 2. In this model, a corresponding bandwidth broker is set for each Diff-Serv management domain, such as bandwidth brokers 1, 2 and 3. The bandwidth broker is in charge of processing bandwidth application requests from user hosts, service servers or network maintainers, and determining whether to authorize user's bandwidth application according to the resource reservation state of the current network, the configured strategy as well as the Service Level Agreement (SLA) signed with the user. This bandwidth broker records various kinds of static or dynamic information, such as SLA configuration information, topology information of physical network, configuration information and strategy information of the router, user authentication information, current resource reservation information, network occupation state information, and also records route information so as to confirm user's service stream path and location of cross-domain downstream bandwidth broker.

The internal structure of the bandwidth broker in FIG. 2 is shown in FIG. 3, including: an inter-domain interface, which communicates with bandwidth brokers of other bearer control layers; a user service interface, which communicates with a service server, a host/user and a network maintenance device; a strategy interface used for strategy control; a network management interface; a route information storage, which records intra-domain route information in a bearer network resource manager; a database; an intra-domain interface and a simple strategy service module. The modules inside the bandwidth broker cooperate with each other. This bandwidth broker records various kinds of static or dynamic information, such as SLA configuration information, topology information of physical network, configuration information and strategy information of the router, user authentication information, current resource reservation information, network occupation state information, and also records route information so as to confirm user's service stream path and location of cross-domain downstream bandwidth broker.

In the network structure model shown in FIG. 2, a router in a bearer network reports route path resource information to a bandwidth broker real-timely. The bandwidth broker acquires route path information suitable for calling service of the client from the reported route path resource information, selects a route path for the call service of the client and reserves bandwidth resource in the route path. This technique scheme has disadvantages as follows, topology and management is very complicated because a bandwidth broker directly manages resources and configuration information of all routers in the area; a route table needs to be updated frequently because a bandwidth broker needs to record dynamic route information of the local area, which will lead to instable network reservation; the service route determined by a bandwidth broker according to dynamic route information of the local area is difficult to be identical with the actual forwarding route of the service stream.

An alternative scheme is Rich QoS scheme presented by NEC company. Its network structure model is shown in FIG. 4, including a QoS server 401 as the key component, a strategy server 402, a catalogue server 403 and a network management monitoring server 404 which are auxiliary with the QoS server. Here, the QoS server is in charge of allocating desirable bearer path for QoS service requests according to topology and resource condition of bearer network. The strategy server 402 sets parameters and configuration of relevant routers according to QoS server 401 and strategy configuration information such as management interface. The catalogue server 403 is a unified and intensive database used for storing network device configuration information, user information and QoS information. The network management monitoring server 404 is in charge of collecting information, such as congestion state of routers and links in the bearer network, for reference for the QoS server when selecting a route for a service application.

In this scheme, LSP information is configured in the QoS server. The QoS server acquires LSP information suitable for the client's calling service from the LSP information, and selects an LSP for the client's calling service and reserves bandwidth resources in the LSP. After a service server sends a bandwidth request to the QoS server, the QoS server records connection resource request for this call, allocates a satisfying bearer path for the service request according to QoS requirements as well as the current topology and the current resource condition of the bearer network, and then returns allocation result to the service server. The LSP information configured in the QoS server is divided into various levels based on priority, and the QoS server selects high-priority LSP information for service requests with high priority and low-priority LSP information for service requests with low priority. However, if there are large amount of service requests with low priorities and small amount of service requests with high priorities, it will lead to network congestion upon services with low priorities and bandwidth idle upon services with high priorities, therefore this scheme is inflexible and low-effective in routing.

In addition, this Rich QoS scheme relates to a pretty complex bearer network with a large number of routers. Meanwhile, QoS server and strategy server notify edge routers by using explicit route MPLS LSP establishment technique and a mode of establishing end-to-end LSP, resulting in poor expansibility and limited network scale. Thus, this scheme is not applicable for end-to-end service requirements in a public network.

The above are several schemes for establishing and allocating resources. As for how to include service route path and signaling route path in multiple route paths and how to select a suitable route, multiple algorithms can be adopted. The selection of service route path and signaling route path can adopt the same or different algorithms. However, since each domain is singly managed by a certain bearer network resource manager, a bearer network resource manager cannot know LSP resource conditions in other domains managed by other bearer network resource managers, which will bring uncertain factors for route availability and thus affect service efficiency of network.

For instance, when a forward routing manner is adopted between a source bearer network resource manager and a destination bearer network resource manager, with reference to network structure shown in FIG. 5, intra-domain routes and inter-domain routes are sequentially selected from a source ER to a destination ER hop by hop, but this route selection manner is liable to lead to route selection failure. This is because if a service stream is to be transmitted from ER2 to ER3, all the four inter-domain LSPs, i.e. LSP11, LSP12, LSP13 and LSP14, between bearer network resource managers 1 and 2 are all selectable; however, when LSP resources between BR3 and ER3 inside bearer network resource manager 2 are used up while resources between BR4 and ER3 are in idle state, bearer network resource manager 1 will still select an inter-domain LSP according to route load sharing algorithm since it does not know LSP resource occupation condition inside the domain managed by bearer network resource manager 2. If LSP11 or LSP13 is selected, the route selection from bearer network resource manager 1 to bearer network resource manager 2 will be failed, thus leading to failure of entire routing. Therefore, in the above case, only adopting forward route selection manner cannot obtain reasonable resource allocation, and the main reason is that one bearer network resource manager does not know LSP resource utilization condition in those domains managed by other bearer network resource managers. In addition, there may be some rule constraints for certain specified performance requirements and services in domains managed by certain bearer network resource managers, for example some specified streams are allowed to or forbidden to pass in a certain intra-domain LSP, which may also lead to route selection failure. However, if simply replacing forward route selection with backward route selection, the above-mentioned problem is also inevitable. Thus requirements of various services cannot be satisfied well.

For another instance, in the prior art, the path through which a service request will pass and occupied bandwidth in this path are calculated according to routing tables in each router. In this case, while implementing intra-domain route selection, once information of a certain router is updated, for example when developing a new service or a service is updated, information of the bearer network resource manager on bearer control layer should also be updated, which may lead to instability of network reservation. Meanwhile, bearer network resource manager needs to record dynamic route information in the local domain, which may result in a problem that routing table will be updated frequently. In this case, network reservation will be instable, and it is also difficult to guarantee the determined service route to be the same as the actual forwarding route of the service stream.

SUMMARY OF THE INVENTION

In view of this, a main object of the present invention is to provide a method for selecting a real-time service data transmission path, which can not only increase success ratio of routing, but also obtain an optimal end-to-end route in a simple and flexible manner and guarantee reasonable resource allocation.

Another object of the present invention is to provide a method for selecting a real-time service data transmission path based on forward constraint and backward routing, which can increase success ratio of routing and guarantee reliable route establishment.

Still another object of the present invention is to provide a method for selecting a real-time service data transmission path based on hop-by-hop routing, which can increase success ratio of searching a next hop route by a bearer network resource manager and guarantee reliability of resource allocation.

Still another object of the present invention is to provide a method for selecting a real-time service data transmission path based on hop-by-hop routing, which can increase success ratio of selecting bearer service connection for a bearer layer by a bearer network resource manager and guarantee reliability of resource allocation.

Still another object of the present invention is to provide a method for selecting a real-time service data transmission path based on label switching, which can not only implement routing in a bearer network resource manager, but also increase success ratio of routing.

Still another object of the present invention is to provide a method for selecting a real-time service data transmission path based on static route, which can decrease routing load of a bearer network resource manager and maintain network stability, with flexible and high-efficient routing and resource allocation.

Still another object of the present invention is to provide a method for selecting a real-time service data transmission path, which can implement service route routing with QoS guarantee cross independent operation networks.

Still another object of the present invention is to provide a method for selecting a real-time service data transmission path, which combines advantages of both E.164 addressing and IP addressing, and thus can simplify a routing table, increase network addressing capability, make routing of a large-scale IP network in operation network simple and fast, and increase stability of network route.

Based on the above-mentioned objects, the present invention provides a method for selecting a real-time service data transmission path, comprising establishing an independent bearer control layer comprising more than one bearer network resource manager between a service control layer and a bearer network, and further comprising:

after a source bearer network resource manager which is connected to the service control layer receives a connection request for a real-time service, orderly selecting and determining, from the source bearer network resource manager towards a destination bearer network resource manager, an intra-domain route path for the real-time service in a management domain corresponding to each bearer network resource manager, and an inter-domain route path between adjacent management domains corresponding to adjacent bearer network resource managers.

The step of selecting and determining an inter-domain route path may comprise: when the connection request is sent from the source bearer network resource manager to the destination bearer network resource manager segment by segment, each bearer network resource manager which receives the connection request reserving available route path resources between itself and the adjacent next hop bearer network resource manager; after the connection request arrives at the destination bearer network resource manager, determining a final route between adjacent bearer network resource managers from the destination bearer network resource manager to the source bearer network resource manager segment by segment, and recovering the route path resources except those reserved for the determined routes.

Alternatively, the step of selecting and determining an intra-domain route path or an inter-domain route path may comprise: each bearer network resource manager or connection node inside a management domain managed by the bearer network resource manager which receives the connection request only determining a route path between itself and the adjacent next hop bearer network resource manager or connection node. Here, the route path is a label switching path.

In the above scheme, the connection request is sent from a source bearer network resource manager to a destination bearer network resource manager segment by segment, after receiving a connection resource response from a next hop bearer network resource manager, each bearer network resource manager ahead of the destination bearer network resource manager allocates path resources in its own management domain.

In the above scheme, the method may further comprise the step of presetting information of all route paths required by each bearer network resource manager, wherein the step of selecting and determining an intra-domain route path or an inter-domain route path comprises: each bearer network resource manager which receives the connection request selecting and determining a proper route from the preset available route paths.

If adopting IP route, the method may further comprise: configuring an area code for management domain of each bearer network resource manager according to E.164 manner, and establishing an inter-domain route information relationship table and an intra-domain route information table for each management area;

wherein the step of selecting and determining an intra-domain route path or an inter-domain route path comprises: selecting an intra-domain route path or an inter-domain route path of a bearer network resource manager according to the established inter-domain route information relationship table and the established intra-domain route information table.

In the above scheme, the more than one bearer network resource manager belongs to the same operation network or different operation networks.

In the above scheme, the step of selecting and determining an inter-domain route path may comprise: determining the inter-route path according to a preset resource constraint condition or a preset routing strategy.

In the above scheme, the method may further comprise: taking all border routers between adjacent bearer network resource managers as entry routers and exit routers respectively, obtaining a path aggregate including paths between each entry router and each exit router, and then selecting a desired inter-domain route between adjacent bearer network resource managers according to the path aggregate.

In the above scheme, the method may further comprise: taking an IP address segments corresponding to all border routers between adjacent bearer network resource managers as entry IP address identifiers and exit IP address identifiers respectively, obtaining a label switching path aggregate including label switching paths between each entry IP address identifier and each exit IP address identifier; and then selecting a desired inter-domain route between adjacent bearer network resource managers according to the label switching path aggregate.

In the above scheme, the step of selecting and determining an intra-domain route path may comprise: determining the intra-domain route path in a management domain of a bearer network resource manager according to a preset resource constraint condition or a preset routing strategy.

In the above scheme, the method may further comprise: for each bearer network resource manager, taking all routers inside a management domain of the bearer network resource manager as entry routers and exit routers respectively, obtaining a path aggregate including paths between each entry router and each exit router, and then selecting a desired intra-domain route of the bearer network resource manager according to the path aggregate.

In the above scheme, the method may further comprise: for each bearer network resource manager, taking all IP address segments inside a management domain of the bearer network resource manager as entry IP address identifiers and exit IP address identifiers respectively, obtaining a label switching path aggregate including label switching paths between each entry IP address identifier and each exit IP address identifier, and then selecting a desired intra-domain route of the bearer network resource manager according to the label switching path aggregate.

The present invention also provides a method for selecting a real-time service data transmission path based on forward constraint and backward routing, comprising:

A1. a bearer network resource manager judging whether itself is a destination bearer network resource manager after receiving a connection resource request, if so, executing step C1; otherwise, executing step B1;

B1. the current bearer network resource manager which receives the connection resource request sending the connection resource request to a next hop bearer network resource manager, and reserving inter-domain route resources, and then returning to step A1;

C1. the current bearer network resource manager which receives the connection resource request judging whether itself is an source bearer network resource manager, if so, implementing establishment of a route path and ending the current routing procedure; otherwise, executing step F1;

D1. the bearer network resource manager which receives a connection resource response recovering the inter-domain route resources;

E1. the current bearer network resource manager which receives the connection resource response judging whether itself is the source bearer network resource manager, if so, implementing establishment of a route path and ending the current routing flow; otherwise, the current bearer network resource manager finding the received corresponding connection resource request according to the received connection resource response; and F1. the current bearer network resource manager selecting an entry border router, confirming a previous hop bearer network resource manager according to the connection resource request, returning a connection resource response to the previous hop bearer network resource manager, and then returning to step D1.

The present invention also provides a method for selecting a real-time service data transmission path based on hop-by-hop routing, comprising:

A2. a bearer network resource manager which receives a connection resource request judging whether itself is a destination bearer network resource manager, if so, implementing establishment of a signaling route path and ending the current routing procedure; otherwise, executing step B2; and B2. the current bearer network resource manager selecting a next hop bearer network resource manager, and sending the connection resource request to the next hop bearer network resource manager; returning to step A2.

The present invention also provides a method for selecting a real-time service data transmission path based on hop-by-hop routing, comprising:

A3. a current bearer network resource manager finding an intra-domain entry Connection Node (CN) according to a received connection resource request, and adding information of the found entry CN to an aggregate of searched routers;

B3. the current bearer network resource manager selecting an intra-domain label switching path according to the current entry CN;

C3. the current bearer network resource manager judging whether exit CN of the selected intra-domain label switching path is an edge server or a border server inside management domain of the current bearer network resource manager, if so, implementing establishment of a service route path and ending the current routing procedure; otherwise, executing step D3; and D3. the current bearer network resource manager judging whether information of the current exit CN is already added into the aggregate of searched routers, if so, abandoning selection of the selected intra-domain label switching path and returning to step B3; otherwise, taking the current exit CN as the current entry CN, recording information of this CN in the aggregate of searched routers, and returning to step B3.

The present invention also provides a method for selecting a real-time service data transmission path based on label switching, comprising:

A4. from a source bearer network resource manager, orderly determining an inter-domain label switching path between each hop bearer network resource manager and a next hop bearer network resource manager and recording the inter-domain label switching path, sending a connection resource request to the next hop bearer network resource manager, and judging whether the next hop bearer network resource manager is the destination bearer network resource manager, if so, executing step B4, otherwise, repeating step A4;

B4. from the destination bearer network resource manager, determining an intra-domain label switching path of each hop bearer network resource manager and recording the intra-domain label switching path, sending the inter-domain label switching path and the intra-domain label switching path recorded by the bearer network resource manager to the previous hop bearer network resource manager by means of a service route resource confirmation response until to the source bearer network resource manager; and C4. the source bearer network resource manager establishing an intra-domain label switching path, and sending the whole label switching path which is from the source bearer network resource manager to the destination bearer network resource manager to an end office router/tandem office router by means of a stream mapping command.

The present invention also provides a method for selecting a real-time service data transmission path based on static configuration, comprising:

A5. pre-configuring route path information required by a bearer network resource manager; and B5. after receiving a connection resource request or a connection resource response, the bearer network resource manager selecting a proper route path from the route path information configured in step A5 according to the connection resource request or the connection resource response.

The present invention also provides a method for selecting a real-time service data transmission path in networks cross independent operation networks, comprising the steps of presetting a virtual destination user in a bearer network resource manager which manages a border router in an independent operation network, bonding this virtual destination user with the border router in the current independent operation network, and the border router being connected to a gateway of a destination independent operation network that manages the destination user, and further comprising:

A6. when a user in the current independent operation network sending a service to a destination user of the destination independent operation network, a resource manager of the current independent operation network determining the virtual destination user according to destination address of this service, determining a border router which bonds the current independent operation network with the virtual destination user, allocating bearer resources and route from the user sending the service to the border router in the current independent operation network for this service; and B6. the current independent operation network and the destination independent operation network determining a route from the user sending the service to the destination user, according to the bearer resources and route allocated in step A6, a preset route between the current independent operation network and the destination independent operation network as well as the bearer resources and route set by the destination independent operation network, and then sending the service.

The present invention also provides a method for selecting a real-time service data transmission path, comprising setting management area code for management area corresponding to each bearer control server according to E.164 manner, establishing a topology relationship table which stores information of routes between different management areas, and establishing a route information table which stores information of routes inside a management area; further comprising:

A7. a calling user sending a call request to a service server of the management area where the calling user is located;

B7. the service server sending a route request to a bearer control server corresponding to the management area according to the received call request;

C7. the bearer control server allocating a route for the calling user according to the received route request and the stored topology relationship table; and D7. after the allocated route arrives at the management area where the called user is located, a bearer control server of the management area where the called user is located selecting a route according to the established route information table of the management area.

According to the methods for selecting a real-time service data transmission path provided in the present invention, when it is needed to establish an end-to-end route from a source bearer network source manager to a destination bearer network source manager for a real-time service in an IP network configured with a bearer control layer, an intra-domain route of each bearer network source manager and an inter-domain route between adjacent bearer network source managers are determined segment by segment by making use of the division of management domains of bearer network source managers. Therefore, an optimal end-to-end route can be selected, and bandwidth resources on the Internet can be utilized completely and reasonably, reliability of path establishment can be guaranteed, and path selection efficiency and success ratio can be increased also. The present invention is applicable for networks with any topology structure, including networks with various complicated structures, and it is easy to implement, maintain and manage.

BRIEF DESCRIPTION OF THE DRAWINGS

FIG. 18 is a schematic diagram illustrating constitutive structure of an IP data packet in IPv4.

DETAILED DESCRIPTION OF THE INVENTION

To make objects, technique schemes and advantages of the present invention clear, the present invention will be described in detail hereinafter with reference to accompanying drawings and specific embodiments.

Figure 1:
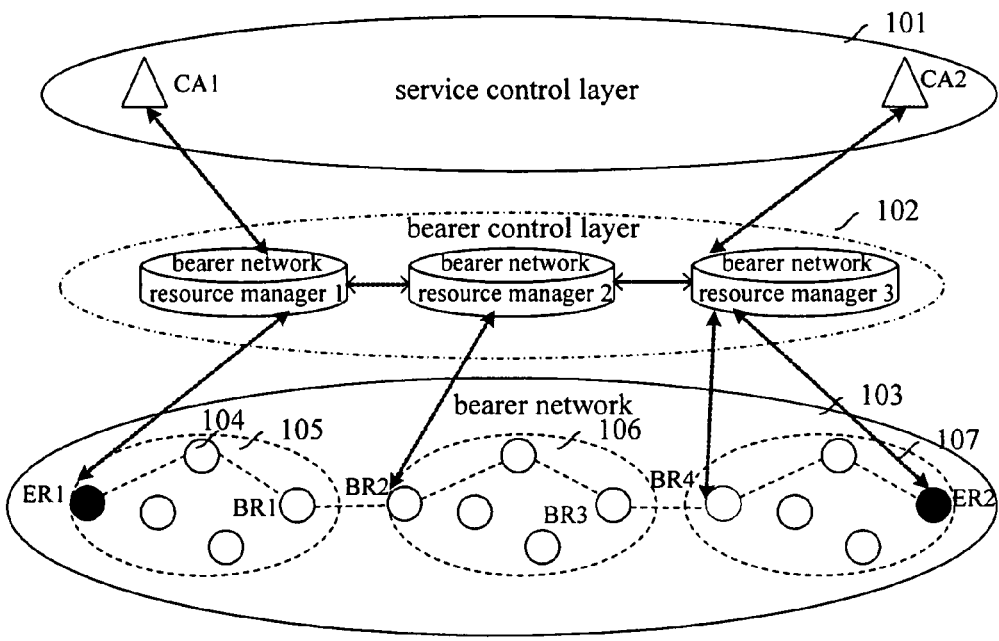
FIG. 1 illustrates a differentiated service model with independent bearer control layer in the prior art.
Figure 2:
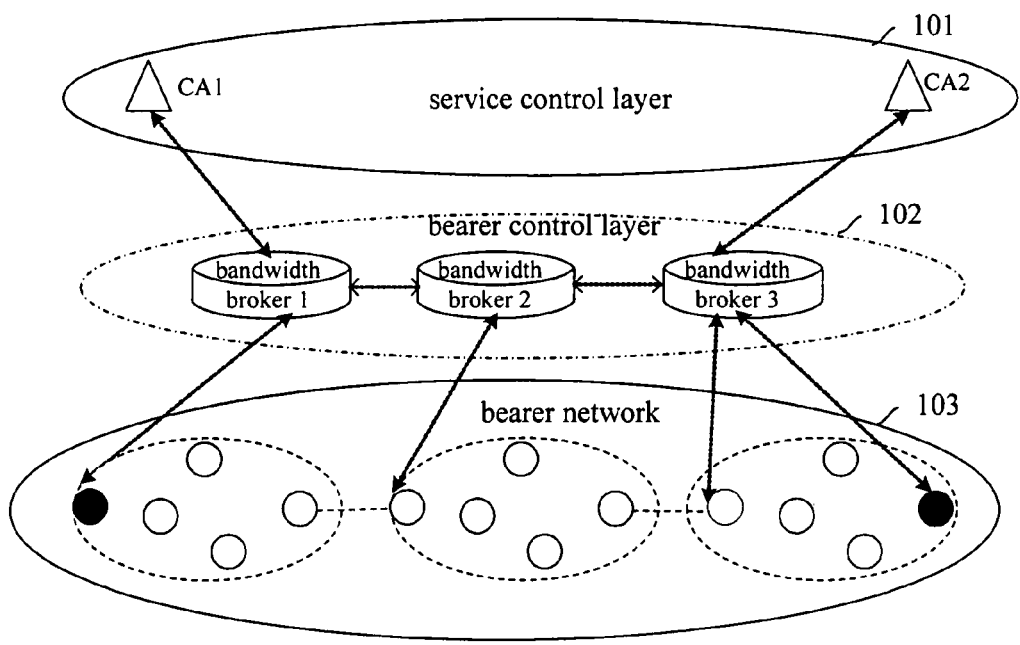
FIG. 2 illustrates network framework of a bandwidth broker model in QBone network in the prior art.
Figure 3:
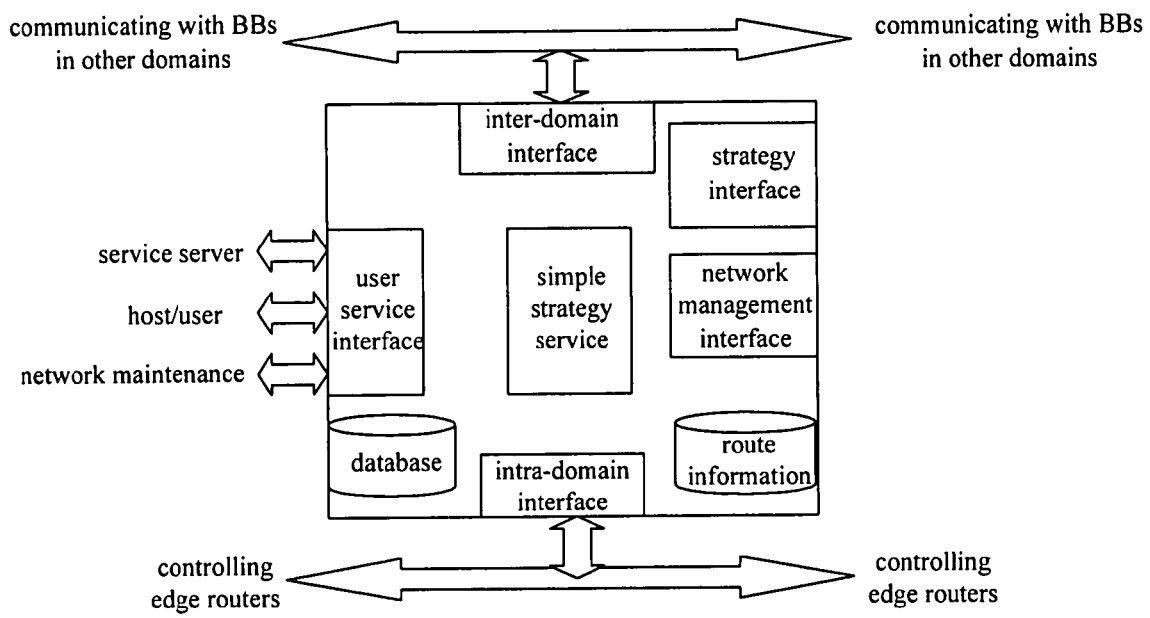
FIG. 3 is a schematic diagram illustrating internal structure of the bandwidth broker shown in FIG. 2.
Figure 4:
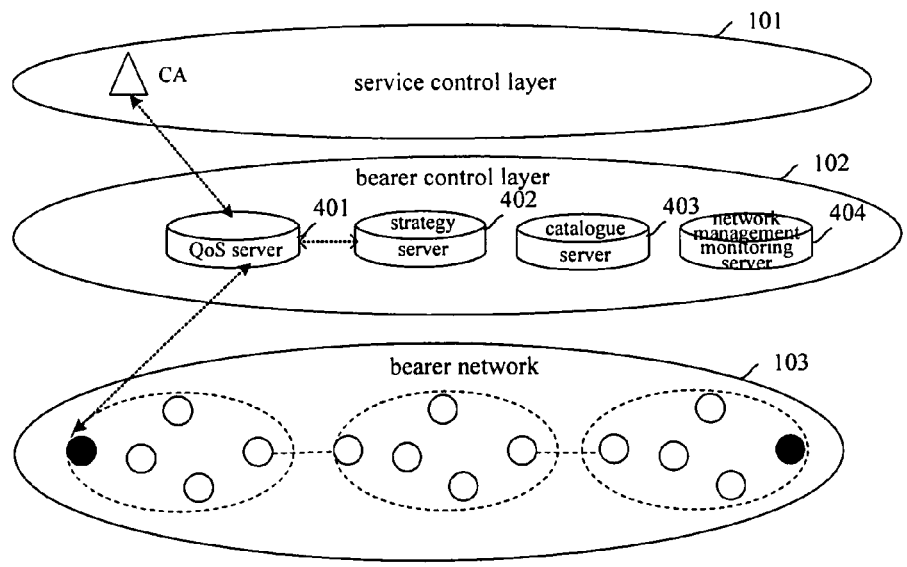
FIG. 4 illustrates network structure of Rich QoS scheme presented by NEC company in the prior art.

Core idea of the present invention is: in the network topology structure shown in FIG. 1, after receiving a connection request for a real-time service sent by a call agent in a service control layer, a source bearer network resource manager sends the connection request to a destination bearer network resource manager in sequence from itself, orderly selects and determines an intra-domain route path for the real-time service in a management domain corresponding to each bearer network resource manager, and an inter-domain route path between adjacent management domains corresponding to adjacent bearer network resource managers, thereby selects an optimal route from the source bearer network resource manager to the destination bearer network resource manager.

Here, the route from the source bearer network resource manager to the destination bearer network resource manager can also be called an end-to-end route. An optimal end-to-end route can be determined by means of a plurality of different routing manners, such as forward constraint backward routing, hop-by-hop routing, static configuration routing. The route path can be a label switching path or another bearer network path.

The First Embodiment

Forward Constraint and Backward Routing

Main idea of this routing method is as follows. Each bearer network resource manager, including a source bearer network resource manager, selects a next hop bearer network resource manager according to destination address in a request message and network topology structure after detecting itself is not a destination bearer network resource manager according to the received connection resource request message, namely after detecting the service stream in this request message should not be transmitted to external networks via any ER inside management domain of this bearer network resource manager, and then sends the connection resource request message to the next hop bearer network resource manager, and reserves inter-domain route resources between itself and the next hop bearer network resource manager. If detecting that itself is the destination bearer network resource manager according to the received connection resource request message, namely detecting that the service stream in this request message needs to be transmitted to an external network via a certain ER inside management domain of this bearer network resource manager, a certain bearer network resource manager selects an entry BR and an LSP inside the domain managed by this bearer network resource manager according to the request message, and then sends a connection resource response message including information about the selected entry BR to the previous hop bearer network resource manager. The previous hop bearer network resource manager selects a certain LSP inside its domain according to this entry BR, recovers the reserved inter-domain route resources, and also sends a connection resource response message including information about the entry BR in the LSP selected by itself to its previous hop bearer network resource manager. The rest may be deduced by analogy, until the source bearer network resource manager also receives a connection resource response message. Then the source bearer network resource manager selects an intra-domain LSP with the same method, recovers the reserved inter-domain route resources and finally sends a connection resource response message to the CA. So far, a whole route path has been established.

Figure 6:
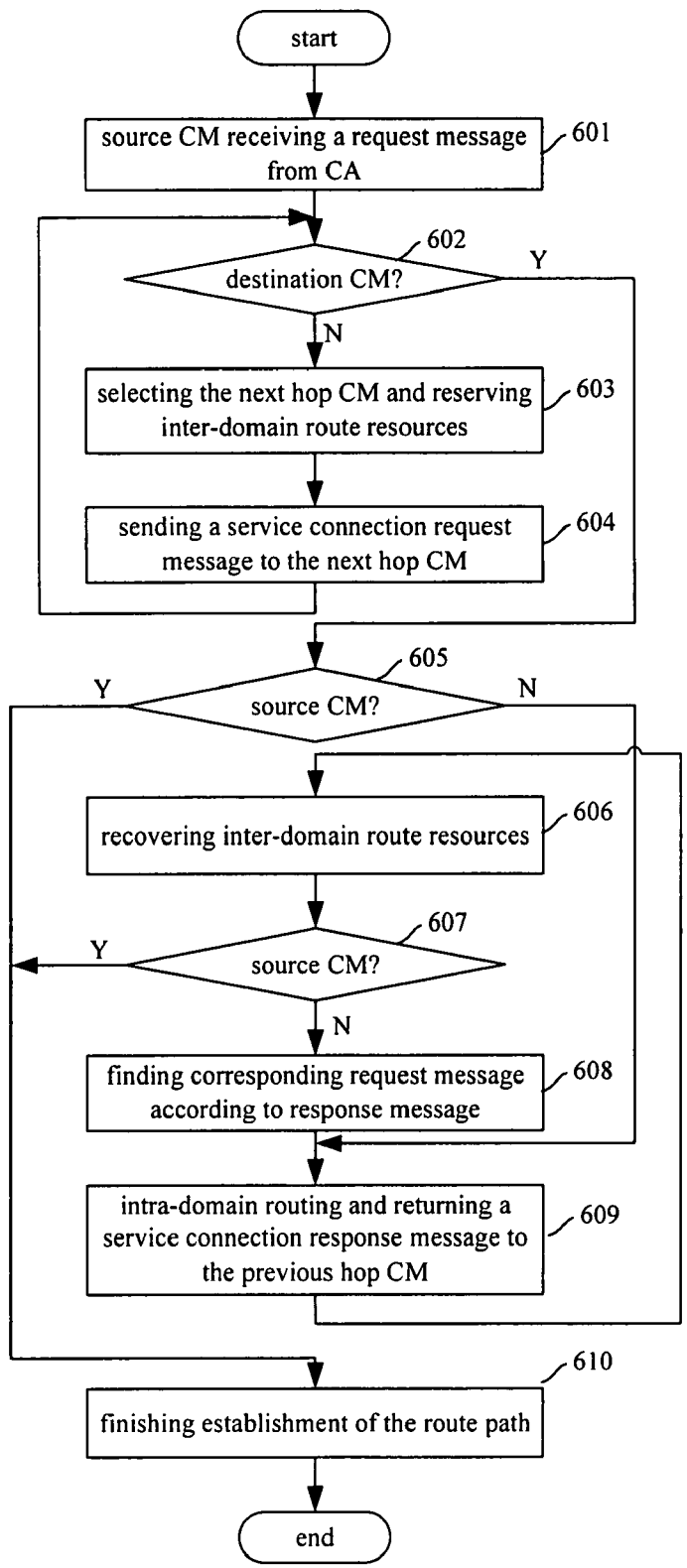
FIG. 6 is a flowchart of route path establishment between bearer network resource managers according to a first embodiment of the present invention.

FIG. 6 is a flowchart of signaling route path establishment between bearer network resource managers by utilizing the routing method of forward constraint and backward routing.

In step 601, a resource bearer network resource manager receives a connection resource request message from a CA, the request message including connection information, QoS parameters, service type etc. Here, the connection information includes session ID, IP address or domain name of a calling party, IP address or domain name of a called party. The QoS parameters include flow descriptor and bandwidth requirement information.

In step 602, after receiving the connection resource request message, a bearer network resource manager judges whether itself is the destination bearer network resource manager, namely whether the service stream in this request message should be transmitted to an external network via a certain ER inside management domain of this bearer network resource manager. If so, step 605 will be executed; otherwise, step 603 will be executed.

In step 603, the bearer network resource manager selects a next hop bearer network resource manager according to destination address in the connection resource request message, and selects an LSP for each selectable BR on the next hop bearer network resource manager side when selecting an intra-domain LSP between itself and the next hop bearer network resource manager, and reserves some bandwidths in each selected LSP, namely reserves intra-domain route resources.

In step 604, this bearer network resource manager sends a connection resource request message to the next hop bearer network resource manager, and then step 602 will be executed.

In step 605, this bearer network resource manager judges whether itself is the source bearer network resource manager. If so, step 610 will be executed; otherwise, step 609 will be executed.

In step 606, according to the entry BR provided in the response message, the bearer network resource manager which receives the connection resource response message recovers the bandwidths reserved for the LSPs relating to those BRs other than the provided entry BR between itself and the next hop bearer network resource manager which returns the response message, namely reserves intra-domain route resources.

In step 607, this bearer network resource manager judges whether itself is the source bearer network resource manager. If so, step 610 will be executed; otherwise, step 608 will be executed.

In step 608, this bearer network resource manager finds the received corresponding connection resource request message according to the connection resource response message.

In step 609, according to signaling route path between itself and the next hop bearer network resource manager, as well as according to information about selectable border routers provided in the connection resource request information, this bearer network resource manager selects a suitable intra-domain LSP inside the management domain of itself, and then determines an entry BR according to the selected intra-domain LSP. After determining the previous hop bearer network resource manager according to the connection resource request message, the bearer network resource manager returns a connection resource response message to the previous hop bearer network resource manager, the response message including information about the entry BR selected by this bearer network resource manager and route selection information of the downstream bearer network resource managers, and then returns to execute step 606.

In step 610, route path establishment is completed. Specifically, the source bearer network resource manager sends a stream mapping command to the ER inside the local domain. Here, the ER is the entry ER of the above-mentioned established route path. The command includes QoS, stream information, route path information etc. The source bearer network resource manager returns a connection resource response message to the CA after receiving a response for the stream mapping command from the ER inside its domain.

Here, the connection resource request message in step 604 includes a BR aggregate called constraint aggregate. Each BR in this constraint aggregate is an exit BR of each selectable intra-domain LSP between the current bearer network resource manager and the next hop bearer network resource manager, and each exit BR belongs to the next hop bearer network resource manager. Actually, this constraint aggregate provides a constraint condition for the next hop bearer network resource manager, namely the next hop bearer network resource manager can only select an entry BR of intra-domain LSP from this constraint aggregate.

Alternatively, in step 609, after selecting an entry BR in its own management domain according to the connection resource request message, this bearer network resource manager selects an intra-domain LSP, and then determines the previous hop bearer network resource manager according to the connection resource request message.

Figure 7:
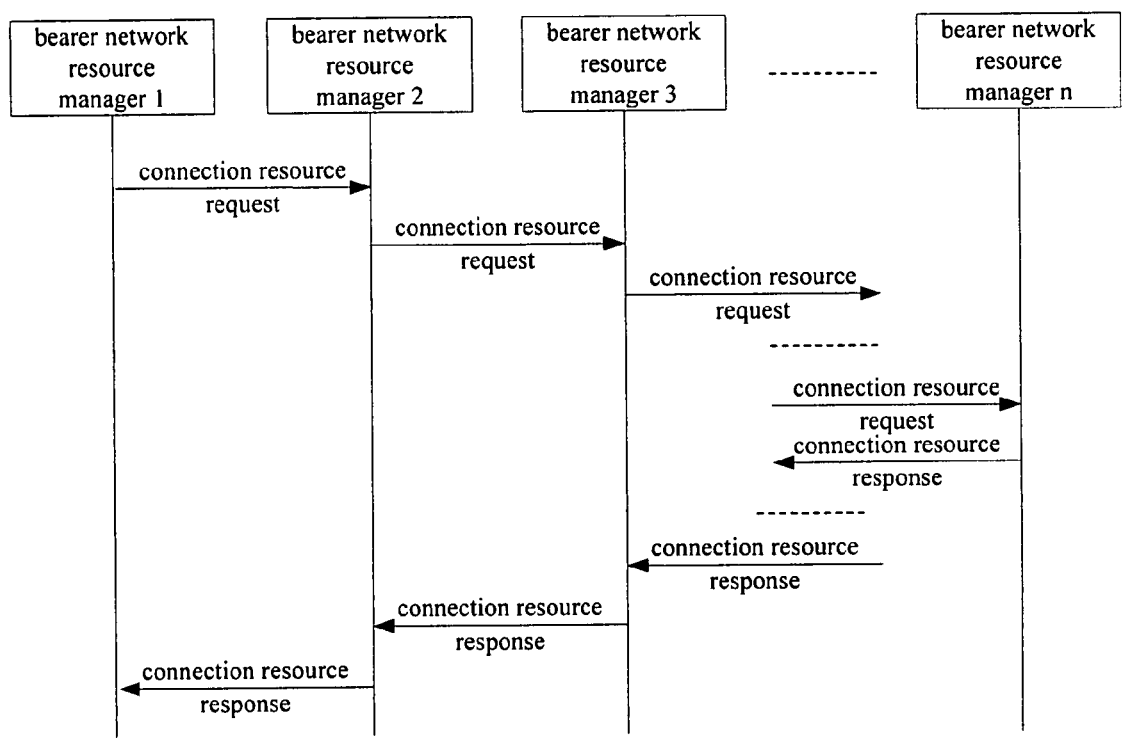
FIG. 7 is a schematic diagram illustrating message interaction between multiple bearer network resource managers according to the first embodiment of the present invention.

FIG. 7 is a schematic diagram illustrating message interaction between multiple bearer network resource managers. Here, bearer network resource manager 1 is the source bearer network resource manager and bearer network resource manager n is the destination bearer network resource manager, the other bearer network resource managers are intermediate bearer network resource managers.

When the source bearer network resource manager, i.e. bearer network resource manager 1, judging that itself is not the destination bearer network resource manager after receiving the connection resource request sent by a CA, it selects a next hop bearer network resource manager according to destination address in this connection request and network topology structure. When selecting an inter-domain LSPs between itself and the next hop bearer network resource manager, such as bearer network resource manager 2, if exits of these LSPs are different BRs on the side of bearer network resource manager 2, bearer network resource manager 1 will notify the next hop bearer network resource manager of an aggregate composed of exit BRs of all available inter-domain LSPs on the side of bearer network resource manager 2, i.e. a constraint aggregate, by means of a connection resource request message. Meanwhile, bearer network resource manager 1 notifies bearer network resource manager 2 to perform inter-domain routing and that entry BR of the selected inter-domain LSP must be one BR in the above-mentioned constraint aggregate when bearer network resource manager 2 performs intra-domain routing. Then, bearer network resource manager 1 selects an inter-domain LSP for each selectable BR in the constraint aggregate, reserves certain bandwidths on each selected inter-domain LSP, namely reserves inter-domain route resources, and sends a connection resource request message to bearer network resource manager 2. After receiving the connection resource request sent by bearer network resource manager 1, bearer network resource manager 2 determines that itself is not the destination bearer network resource manager, and selects a next hop bearer network resource manager with the same method as used by bearer network resource manager 1, namely selects bearer network resource manager 3, reserves inter-domain route resources and sends a connection resource request message to bearer network resource manager 3. The rest may be deduced by analogy. That is, if determining that itself is not the destination bearer network resource manager after receiving a connection resource request sent by the previous hop bearer network resource manager, each bearer network resource manager will select a next hop bearer network resource manager with the same method as used by bearer network resource manager 1, reserve certain inter-domain route resources, and send a connection resource request message to the next hop bearer network resource manager.

When determining that itself is the destination bearer network resource manager according to the connection resource request message sent by the previous hop bearer network resource manager, the destination bearer network resource manager, i.e. bearer network resource manager n, will select an entry BR from the constraint aggregate provided in this message and determine an intra-domain LSP according to the connection resource request message, return a connection resource response message to the previous hop bearer network resource manager after determining the previous hop bearer network resource manager, and notify the previous hop bearer network resource manager of the selected entry BR by means of this response message. According to the entry BR provided in the received connection resource response message, the previous hop bearer network resource manager of bearer network resource manager n recovers the inter-domain route resources reserved for the LSPs relating to those BRs other than the provided entry BR between itself and bearer network resource manager n, and then judges whether itself is the source bearer network resource manager. If not, it will find the connection resource request message corresponding to the received connection resource response message returned from bearer network resource manager n, and then select an entry BR and an intra-domain LSP with the method as used by bearer network resource manager n, determine its previous hop bearer network resource manager, and then return a connection resource response message to its previous hop bearer network resource manager, and notify the previous hop bearer network resource manager of the selected entry BR by means of the response message. The rest may be deduced by analogy. That is, each bearer network resource manager other than the source bearer network resource manager recovers inter-domain route resources by using the above-described method, selects an entry BR and an intra-domain LSP, returns a connection resource response message to its previous hop bearer network resource manager, until a connection resource response message arrives at the source bearer network resource manager. After receiving the connection resource response message, the source bearer network resource manager recovers the inter-domain route resources reserved for the LSPs relating to those BRs other than the provided entry BR between itself and the next hop bearer network resource manager which sends the connection resource response message according to the entry BR provided in the message, then selects an intra-domain LSP and finally finishes establishment of the whole route path. Then, the source bearer network resource manager sends a stream mapping command to the ER inside the local domain, and returns a connection resource response message to the CA after receiving a response for the stream mapping command from the intra-domain ER.

In the above-described procedure, if there is excessive inter-domain or intra-domain selectable path information, it will lead to complex calculation and increase system overhead. In this case, some constraint conditions, such as service type, priority, some locally configured routing strategies, some specified QoS requirements as well as the current network status such as resource availability conditions, service flow, can be added in order to simplify the calculation.

Figure 5:
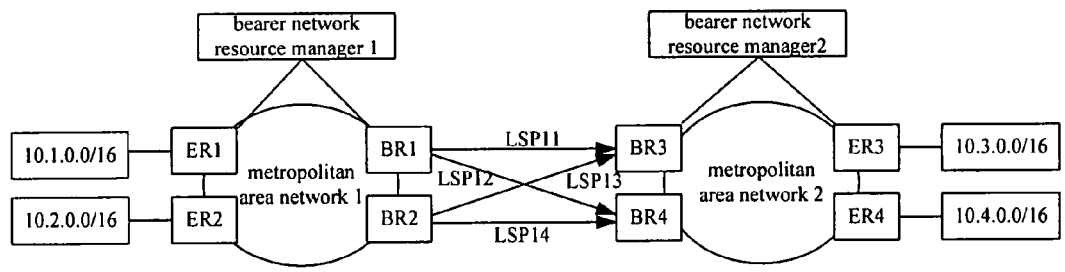
FIG. 5 is a schematic diagram illustrating routing by a bearer network resource manager.

A specific embodiment of the above-noted routing method will be described hereinafter with reference to FIG. 5. Assume that bearer network resource manager 1 manages edge servers ER1 and ER2 while bearer network resource manager 2 manages edge servers ER3 and ER4, and that address segments connected by ER1~ER4 are respectively 10.1.0.0~10.1.255.255, 10.2.0.0~10.2.255.255, 10.3.0.0~10.3.255.255 and 10.4.0.0~10.4.255.255, as shown in FIG. 5.

Now if a CA sends a connection resource request message to bearer network resource manager 1, requiring to transfer a certain service stream from ER2 managed by bearer network resource manager 1 to ER3 managed by bearer network resource manager 2, bearer network resource manager 1 will determine that itself is not the destination bearer network resource manager according to this connection resource request message, namely determine this service stream should not be transferred to an external network via any ER in the domain of itself, and then select a next hop bearer network resource manager, such as bearer network resource manager 2, according to destination address in the request message and network topology structure. After selecting the next hop bearer network resource manager, bearer network resource manager 1 detects that this service stream can be transmitted from ER2 to BR1 or BR 2 by means of an intra-domain LSP, and that bearer network resource manager 2 can receive the service stream transmitted by bearer network resource manager 1 using BR3 or BR4, that is, there are four selectable inter-domain LSPs between bearer network resource managers 1 and 2: LSP11, LSP12, LSP13 and LSP14. However, the four inter-domain LSPs have two exits that are BR3 and BR4 managed by bearer network resource manager 2, specifically, exit of LSP11 and LSP13 is BR3, while exit of LSP12 and LSP14 is BR4. In this case, bearer network resource manager 1 will select an inter-domain LSP for each selectable BR according to selectable BRs on the side of bearer network resource manager 2, for example only select LSP11 and LSP12, or LSP11 and LSP14, or LSP12 and LSP13, or LSP13 and LSP14. Then bearer network resource manager 1 will reserve certain bandwidths for each selected inter-domain LSP, namely reserve inter-domain route resources, and then send a connection resource request message to bearer network resource manager 2. The message includes a constraint aggregate {BR3, BR4} for bearer network resource manager 2 to select a BR from the aggregate. While performing intra-domain route selection, bearer network resource manager 2 must guarantee entry BR of the selected LSP is from the above-noted aggregate.

After receiving the connection resource request message sent by bearer network resource manager 1, according to this message, bearer network resource manager 2 determines that the service stream to be transmitted should be transmitted to an external network via an ER inside the domain managed by itself, i.e. ER3, and detects that in the domain managed by itself, there are a selectable intra-domain LSP between BR3 and ER3 and a selectable intra-domain LSP between BR4 and ER3. Then, bearer network resource manager 2 can select either BR3 or BR4 as entry BR of intra-domain LSP according to a certain condition or algorithm. If selecting BR4 and determining an intra-domain LSP from BR4 to ER3, bearer network resource manager 2 sends a connection resource response message to bearer network resource manager 1, and reports information of BR4 to bearer network resource manager 1 by means of this message. According to the above selection result, bearer network resource manager 1 recovers bandwidths reserved for all the LSPs whose exit BR is BR3, determines an exit BR of an LSP inside its own domain, selects an intra-domain LSP from ER2 to this exit BR, thereby finishing establishment of the whole route path. And then, bearer network resource manager 1 sends a stream mapping command to ER2 inside its own domain, the command including information such as QoS, stream information and route path. After receiving a response for the stream mapping command from ER2, bearer network resource manager 1 returns a connection resource response message to the CA.

In the above procedure, if bearer network resource manager 2 selects BR3 as entry BR of intra-domain LSP and determines an intra-domain LSP from BR3 to ER3, bearer network resource manager 2 sends a connection resource response message to bearer network resource manager 1, and reports information of BR3 to bearer network resource manager 1 by means of this message. According to the above selection result, bearer network resource manager 1 recovers bandwidths reserved for all the LSPs whose exit BR is BR4, determines an exit BR of an LSP inside its own domain, and selects an intra-domain LSP from ER2 to this exit BR, thereby finishing establishment of the whole route path. And then, bearer network resource manager 1 sends a stream mapping command to ER2 inside its own domain, the command including information such as QoS, route path. After receiving a response for the stream mapping command from ER2, bearer network resource manager 1 returns a connection resource response message to the CA.

Though the above-described embodiment is described by taking a service stream transmission procedure between two bearer network resource managers which respectively include two BRs as example, the present embodiment is also applicable for a service stream transmission procedure between two or more than two bearer network resource managers which respectively include one or more than one BR.

In addition, if there are a plurality of inter-domain LSPs between two bearer network resource managers, such as bearer network resource managers 1 and 2, and entry BR of each inter-domain LSP is on the side of bearer network resource manager 1 while exit BR is on the side of bearer network resource manager 2, one or more than one inter-domain LSP can be selected for each selectable exit BR, and certain bandwidths are reserved for each selected LSP, namely inter-domain route resources are reserved. In practical application, the above-noted manner may lead to a great amount of waste of inter-domain resources, thus bearer network resource manager 1 may select an optimal aggregate of entry BRs on the side of bearer network resource manager 1 according to a certain algorithm, such that an aggregate of exit BRs of the inter-domain LSPs corresponding to all entry BRs in the above-noted optimal aggregate comprises all available exit BRs on the side of bearer network resource manager 2.

The present routing scheme provides a routing manner of forward constraint and backward routing. In detail, a bearer network resource manager will reserve some inter-domain route resources when selecting an inter-domain LSP, and report exit BRs of all available LSPs to a next hop bearer network resource manager. The aggregate of exit BRs indicates entry BRs of the next hop bearer network resource manager. After selecting an LSP, the next hop bearer network resource manager will report the selected exit BR to the previous hop bearer network resource manager. And then the previous hop bearer network resource manager recovers the route resources reserved for those LSPs relating to other BRs. This method of reserving inter-domain route resources beforehand and then determining intra-domain and inter-domain route makes it possible to completely and reasonably utilize the resources of each bearer network resource manager and to increase success ratio of routing.

By adopting the mechanism of combining forward routing and backward routing, and by way of reserving inter-domain route resources beforehand and then determining intra-domain and inter-domain route, the current routing method can make complete and reasonable use of the resources of each bearer network resource manager, guarantee the reliable establishment of route, thus makes it possible to utilize network resources reasonably and increase efficiency and success ratio of routing. The current routing method is applicable for networks of any topology structure, and is easy to implement, maintain and manage.

The Second Embodiment

Hop-by-Hop Routing Manner

The present routing scheme provides a method of hop-by-hop routing in a bearer network, its key idea is: under the condition that each bearer network resource manager in a bearer control layer only knows the topology structure of its own management domain, or under the condition that each CN only knows its adjacent CNs, the bearer network resource manager or the CN will only select and determine a next hop bearer network resource manager or a next hop CN.

Figure 8:
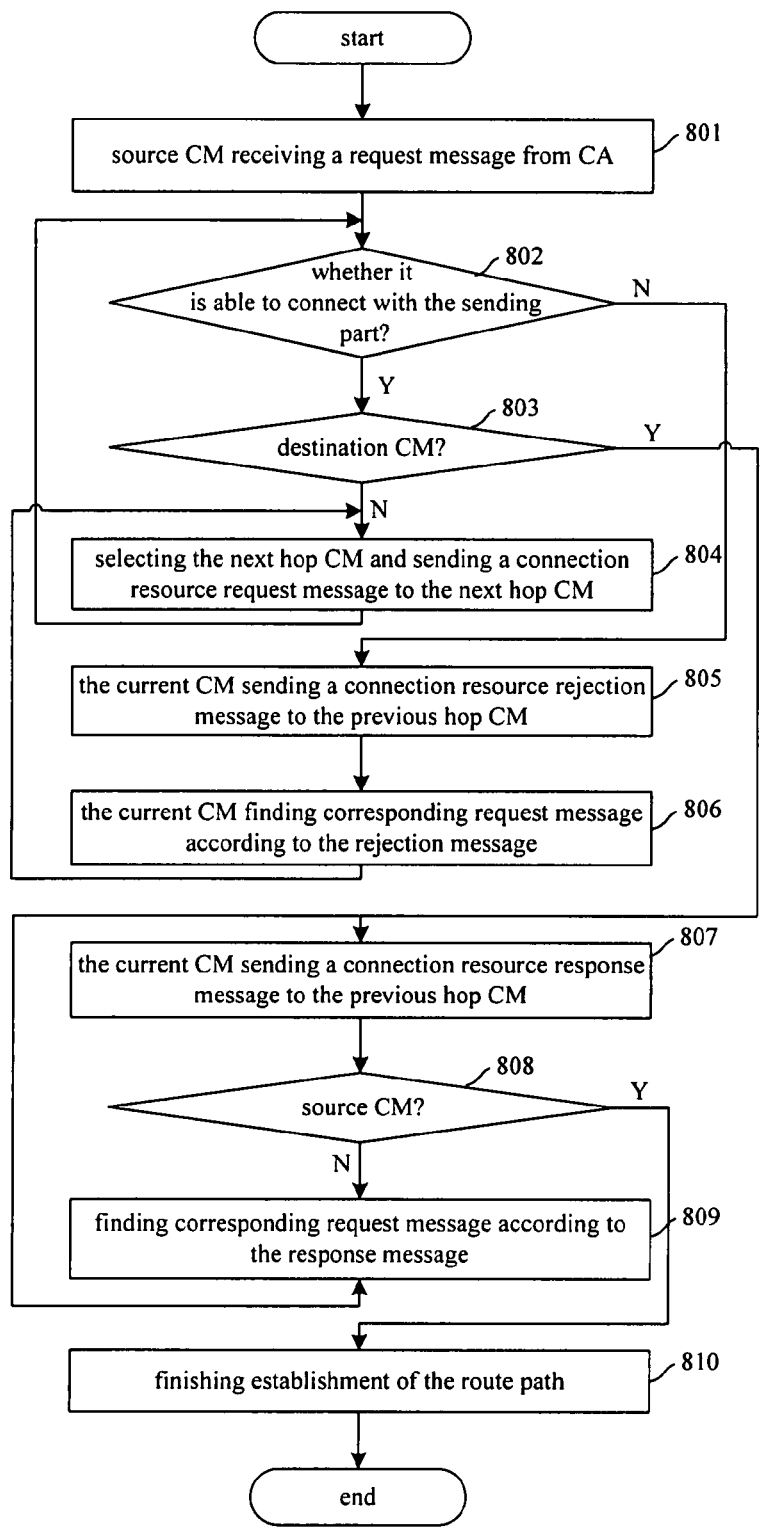
FIG. 8 is a flowchart of signaling route path establishment in a bearer control layer according to a second embodiment of the present invention.

FIG. 8 is a flowchart of signaling route path establishment in a bearer control layer by utilizing the hop-by-hop routing method of the current embodiment.

In step 801, a source bearer network resource manager receives a connection resource request message from a CA, the request message including connection information, QoS parameters, service type etc. Here, the connection information includes session ID, IP address or domain name of a calling party, IP address or domain name of a called party. The QoS parameters include flow descriptor and bandwidth requirement information.

In step 802, the current bearer network resource manager which receives the connection resource request message judges whether connection between itself and the device which sends this request message is available; if unavailable, step 805 will be executed; otherwise, step 803 will be executed. The unavailability means the connection between the current bearer network resource manager and the previous hop bearer network resource manager is not available due to unavailability of resources of the current bearer network resource manager, malfunction of itself or other reasons.

In step 803, according to destination address in the connection resource request message, the current bearer network resource manager judges whether itself is the destination bearer network resource manager, if so, step 807 will be executed; otherwise, step 804 will be executed.

In step 804, according to destination address in the connection resource request message, the current bearer network resource manager determines the next hop bearer network resource manager, and sends a connection resource request message to the selected next hop bearer network resource manager. Then step 802 will be executed.

In step 805, the current bearer network resource manager that receives the connection resource request message returns a connection resource rejection message to the bearer network resource manager that sends this connection resource request message.

In step 806, according to this connection resource rejection message, the current bearer network resource manager that receives the connection resource rejection message finds the received corresponding connection resource request message. Then step 804 will be executed.

In step 807, according to the connection resource request message, the current bearer network resource manager returns a connection resource response message to the bearer network resource manager that sends this request message.

In step 808, the current bearer network resource manager that receives the connection resource response message judges whether itself is the source bearer network resource manager. If so, step 810 will be executed; otherwise, step 809 will be executed.

In step 809, according to the connection resource response message, the current bearer network resource manager finds the received corresponding connection resource request message. And then step 807 will be executed.

In step 810, establishment of signaling route path is completed.

After the signaling route path is established, according to the above-described connection resource request message sent by the CA, the source bearer network resource manager will send a stream mapping command to corresponding entry ER inside its own domain, the command including session ID, stream information, QoS parameters, flow descriptor and label stack of the whole path.

The above-described mechanism in which a bearer network resource manager sends a connection resource response message to the previous hop bearer network resource manager in sequence can be called a confirmation mechanism, and the above-described mechanism in which a bearer network resource manager sends a connection resource rejection message to the previous hop bearer network resource manager in sequence and the previous hop bearer network resource manager reselects a next hop bearer network resource manager can be called a backspace mechanism. By adding such a backspace mechanism and a confirmation mechanism to a hop-by-hop routing method, the present embodiment can maximize reliability of connection establishment and save network resources. Of course, unrestricted backspace is not allowed, so the number of backspaces or a certain time span limitation can be preset in order to guarantee hop-by-hop inquiry efficiency. For instance, if number of backspaces exceeds the preset number, or if a certain bearer network resource manager receives a connection resource rejection message but finds the time span between this received rejection message and corresponding connection resource request message exceeds the preset time span limitation, the current routing will be deemed as failure and the next routing will be started. Or a backspace flag can be used and the flag can be used for backspace for only once.

In practical application, some networks such as reticular networks have complex structure. In the above-described routing procedure, in order to avoid the already selected bearer network resource manager in the selected route paths from being reselected as the next hop bearer network resource manager of a certain bearer network resource manager in this path, an aggregate of searched bearer network resource managers may be set. In this case, step 804 may further comprise: before sending a connection resource request message to the next hop bearer network resource manager, the current bearer network resource manager judges whether the selected next hop bearer network resource manager is in the above-noted aggregate of searched bearer network resource managers; if so, the current bearer network resource manager abandons the selected next hop bearer network resource manager and reselect a next hop bearer network resource manager in step 804, otherwise, the current bearer network resource manager adds its own information to the aggregate of searched bearer network resource managers, and then sends a connection resource request message to the selected next hop bearer network resource manager.

Figure 9:
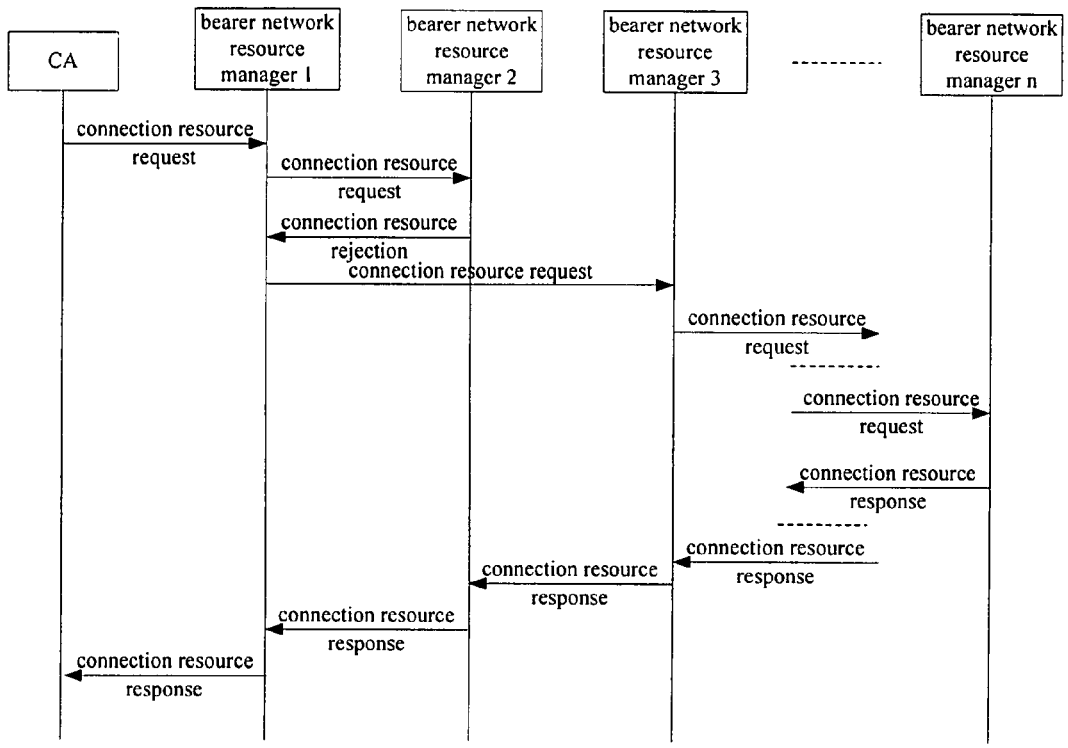
FIG. 9 is a schematic diagram illustrating message interaction between multiple bearer network resource managers during the process of signaling route path establishment according to the second embodiment of the present invention.

FIG. 9 is a schematic diagram illustrating message interaction between multiple bearer network resource managers according to the present embodiment. In FIG. 9, bearer network resource manager 1 is the source bearer network resource manager, bearer network resource manager n is the destination bearer network resource manager, and others are intermediate bearer network resource managers.

When the source bearer network resource manager, namely bearer network resource manager 1, receives a connection resource request message sent by a CA, it judges whether the connection between itself and the transmitting end of this request message, i.e. the CA, is available according to its own status. After determining that itself is not the destination bearer network resource manager according to this request message, bearer network resource manager 1 selects a next hop bearer network resource manager according to information such as service type, resource availability status, priority, locally configured routing strategy as well as destination address in the received connection resource request message, and then sends a connection resource request message to the selected next hop bearer network resource manager, namely bearer network resource manager 2. After receiving the connection resource request message sent by bearer network resource manager 1, according to its own status, such as resource unavailability, self malfunction or other reasons, bearer network resource manager 2 determines that the connection between itself and the transmitting end of this request message, namely bearer network resource manager 1, is not available, and then returns a connection resource rejection message to bearer network resource manager 1.

According to the connection resource rejection message returned by bearer network resource manager 2, bearer network resource manager 1 reselects a next hop bearer network resource manager and sends a connection resource request message to the reselected next hop bearer network resource manager, namely bearer network resource manager 3. The rest may be deduced by analogy. After receiving a connection resource request message sent by its previous hop bearer network resource manager, each intermediate bearer network resource manager will judge whether the connection between itself and the previous hop bearer network resource manager is available according to its own situation. If a certain intermediate bearer network resource manager determines that the connection between itself and the previous hop bearer network resource manager is unavailable according to its own situation, it will send a connection resource rejection message to the previous hop bearer network resource manager. The previous hop bearer network resource manager will reselect a next hop bearer network resource manager according to the returned connection resource rejection message, and will send a connection resource request message to the newly selected next hop bearer network resource manager. If a certain intermediate bearer network resource manager determines, after receiving a connection resource request message sent by its previous hop bearer network resource manager, that the connection between itself and the previous hop bearer network resource manager is available according to its own situation, and that itself is not the destination bearer network resource manager according to this request message, it will select a next hop bearer network resource manager according to information such as service type, resource availability status, priority, locally configured routing strategy as well as destination address in the received connection resource request message, and then send a connection resource request message to the selected next hop bearer network resource manager.

After the destination bearer network resource manager, namely bearer network resource manager n, receives a connection resource request message sent by its previous hop bearer network resource manager, it will determine that the connection between itself and the previous hop bearer network resource manager is available. When bearer network resource manager n determines that itself is the destination bearer network resource manager according to this request message, it will return a connection resource response message to the bearer network resource manager that has sent this request message, namely the previous bearer network resource manager of bearer network resource manager n. The previous hop bearer network resource manager of bearer network resource manager n determines that itself is not the source bearer network resource manager according to the received connection resource response message, then finds the received corresponding connection resource request message according to the connection response message returned by bearer network resource manager n, and then returns a connection resource response message to the bearer network resource manager that has sent this connection resource request message, namely to the previous hop bearer network resource manager of the current bearer network resource manager. The rest may be deduced by analogy. Each intermediate bearer network resource manager returns a connection resource response message to its previous hop bearer network resource manager according to the above-mentioned method. When the source bearer network resource manager, namely bearer network resource manager 1, receives a connection resource response message returned by its next hop bearer network resource manager, it will find the received corresponding connection resource request message according to this response message, and then returns a connection resource response message to the CA that has sent this connection resource request message. So far the whole procedure of establishing a signaling route path is completed.

It can be seen from FIG. 9 that, each bearer network resource manager must provide a connection resource response message or a connection resource rejection message for each received connection resource request message, and that each bearer network resource manager sends a connection resource response message or a connection resource rejection message to its previous hop bearer network resource manager only after receiving the connection resource response message or connection resource rejection message from its next hop bearer network resource manager. Through this confirmation mechanism and backspace mechanism, reliability of resource allocation is ensured and resource waste is avoided.

Figure 10:
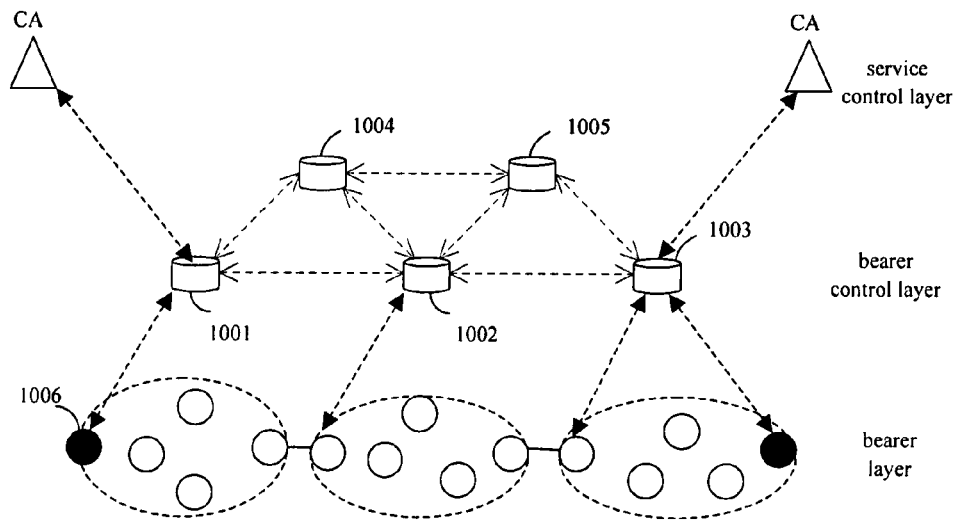
FIG. 10 is a schematic diagram illustrating signaling route path establishment in a bearer control layer according to the second embodiment of the present invention.

FIG. 10 is a schematic diagram illustrating signaling route path establishment in a bearer control layer according to the present embodiment. In the present embodiment, the method of establishing a signaling route path is as follows.

When receiving a connection resource request message sent by a CA, bearer network resource manager 1001 determines that itself is not the destination bearer network resource manager according to this request message, then selects all bearer network resource managers that can be selected as a next hop bearer network resource manager according to destination address in this request message as well as topology of other bearer network resource managers adjacent to bearer network resource manager 1001. As shown in FIG. 10, since bearer network resource manager 1002 and 1004 are adjacent to bearer network resource manager 1001, bearer network resource manager 1001 takes both bearer network resource managers 1002 and 1004 as selectable next hop bearer network resource managers, and then selects either bearer network resource manager 1002 or 1004 as the next hop bearer network resource manager according to information such as service type, resource availability status, priority and locally configured routing strategy. In the present embodiment, assuming the next hop bearer network resource manager selected by bearer network resource manager 1001 is bearer network resource manager 1002, bearer network resource manager 1001 sends a connection resource request message to bearer network resource manager 1002. The request message includes information such as session ID, quintuple, service type, QoS parameters and address of exit BR of the selected inter-domain LSP, and is used for bearer network resource manager 1002 to perform intra-domain routing. Likely, bearer network resource manager 1002 determines that itself is not the destination bearer network resource manager according to the connection resource request message sent by bearer network resource manager 1001, so also follows the above-described rule to select all bearer network resource managers that can be selected as the next hop bearer network resource manager. Here, the selectable bearer network resource managers are bearer network resource managers 1003 and 1005, as shown in FIG. 10, and then bearer network resource manager 1002 selects either bearer network resource manager 1003 or 1005 as the next hop bearer network resource manager. In the present embodiment, assuming bearer network resource manager 1002 selects bearer network resource manager 1003 as the next hop bearer network resource manager and sends a connection resource request message to it. According to the connection resource request message sent by bearer network resource manager 1002, bearer network resource manager 1003 determines that itself is just the destination bearer network resource manager, and then returns a connection resource response message to bearer network resource manager 1002. In like manner, bearer network resource manager 1002 returns a connection resource response message to bearer network resource manager 1001; bearer network resource manager 1001 returns a connection resource response message to the CA and finally completes the whole procedure of establishing the signaling route path. Then, according to the above-noted received connection resource request message, bearer network resource manager 1001 sends a stream mapping command to ER 1006 which is an entry of the local domain, the command including session ID, stream information, QoS parameters, flow descriptor and label stack of the whole path.

In the above procedure, if a certain bearer network resource manager on this signaling route path detects that the connection between itself and its previous hop bearer network resource manager is unavailable due to resource unavailability, self malfunction or other reasons, this bearer network resource manager will sends a connection resource rejection message to its previous hop bearer network resource manager, notifying the previous hop bearer network resource manager to select another bearer network resource manager on the selectable route paths as the next hop bearer network resource manager. For example, in the above-noted embodiment, if bearer network resource manager 1002 detects malfunction in itself, or detects that resources on the LSP between itself and bearer network resource manager 1001 are used up, bearer network resource manager 1002 will send a connection resource rejection message to bearer network resource manager 1001, and bearer network resource manager 1001 can reselect a next hop bearer network resource manager according to this rejection message. In the above embodiment, bearer network resource manager 1001 can select bearer network resource manager 1004 as the next hop bearer network resource manager. The rest may be deduced by analogy, signaling route path can be established through the rouge path from bearer network resource manager 1004 to bearer network resource manager 1003 via bearer network resource manager 1005.

The above-described mechanism in which a bearer network resource manager sends a connection resource rejection message to the previous hop bearer network resource manager in sequence is called a backspace mechanism, which can maximize reliability of connection establishment. In practical application, number of backspaces or a certain time span limitation can be preset in order to guarantee hop-by-hop inquiry efficiency.

The above describes the procedure of establishing a signaling route path by adopting the hop-by-hop routing method according to the present embodiment. The principle and mechanism of this method are also applicable for intra-domain routing of a certain bearer network resource manager in its managed domain, the only difference being that each bearer network resource manager independently completes its intra-domain routing rather than implementing message interaction between bearer network resource managers. In a domain managed by a bearer network resource manager, each CN stores its own routing table. Therefore, in the method provided by the present embodiment, each bearer network resource manager simulates a routing table for every CN in its domain, namely bearer network resource manager gets the routing information stored by CN and stores them in itself. Then, a bearer network resource manager performs intra-domain routing according to routing table of each CN. While performing intra-domain routing, each bearer network resource manager can utilize hop-by-hop routing method to select routes between various CNs, and select an LSP path aggregate to carry this service stream.

Figure 11:
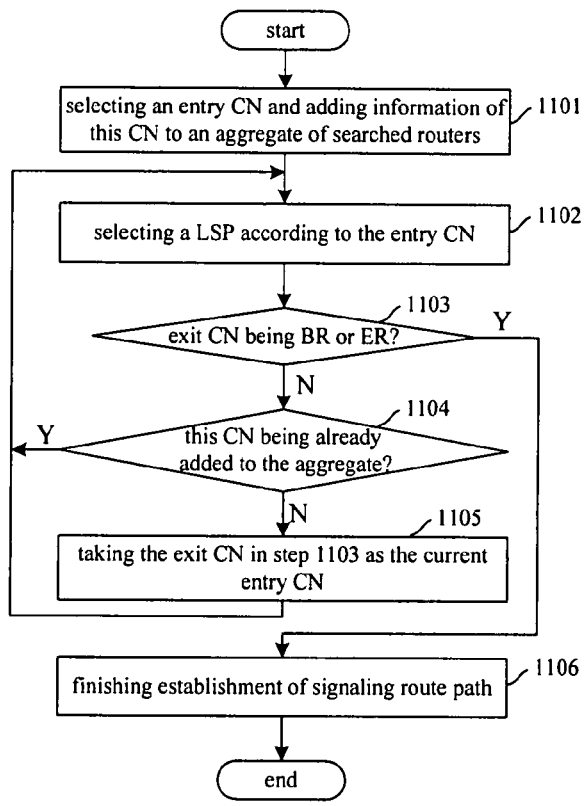
FIG. 11 is a flowchart of service route path establishment in a bearer control layer according to the second embodiment of the present invention.

FIG. 11 is a flowchart of service route path establishment in a bearer control layer according to the present embodiment. The specific steps are as follows.

In step 1101, the bearer network resource manager which is performing intra-domain routing judges whether itself is the source bearer network resource manager. If so, this bearer network resource manager finds an entry ER inside its domain according to IP address information in the connection resource request message received from a CA and take the found entry ER as entry CN, and adds information of this entry ER to an aggregate of searched routers; otherwise, the current bearer network resource manager finds an entry BR according to information in the received connection resource request message, takes the found entry BR as entry CN, and adds information of this entry ER to the aggregate of searched routers. Here, any intra-domain LSP comprises an entry CN and an exit CN.

In step 1102, an intra-domain LSP is selected according to the current entry CN. This intra-domain LSP can be selected randomly, or according to some conditions such as user address, LSP activation status, routing priority, bandwidth requirements and so on.

In step 1103, it is judged whether the selected router on the other end, namely exit CN, is a BR or an ER inside the domain managed by the current bearer network resource manager, if so, this intra-domain LSP is successfully selected and step 1106 will be executed; otherwise, step 1104 will be executed.

In step 1104, it is judged whether the above-noted exit CN is already added to the above-noted aggregate of searched routers, if so, the selection of the above-selected LSP will be abandoned, and step 1102 in which an LSP is reselected will be executed; otherwise, step 1105 will be executed.

In step 1105, the exit CN in step 1103 is taken as entry CN and step 1102 will be executed.

In step 1106, the procedure of establishing service route path is completed and the current routing flow will be ended.

To sum up, the hop-by-hop routing method according to the present embodiment can be adopted for selecting both inter-domain signaling route path and intra-domain service routing, or the hop-by-hop routing method according to the present embodiment is adopted for selecting signaling route while other algorithms are used for selecting service route, or the hop-by-hop routing method according to the present embodiment is adopted for selecting service route while other algorithms are used for selecting signaling route. Or, the hop-by-hop routing method according to the present embodiment is adopted for selecting intra-domain route while other algorithms are used for selecting inter-domain route; and vice versa. Specific routing schemes can be determined according to network situation and service requirements.

By utilizing the mechanism of hop-by-hop application and confirmation as well as backspace and reselecting method, with the present routing scheme, resource allocation reliability is guaranteed, and success ratio of inter-domain and intra-domain routing by each bearer network resource manager in the bearer control layer is improved. By adopting this routing method, since there is backspace and reselecting mechanism in this method, even if malfunction happens to a certain node or link in the network, the malfunction will exert very little influence in providing accurate route information. Furthermore, the hop-by-hop routing method provided in the present embodiment has no special requirement for network structure, and is applicable for networks of any topology structure, including various complex networks.

The Third Embodiment

Static Routing Manner

The core idea of the present embodiment is as follows. Route path information is pre-configured either in a bearer network resource manager statically or by utilizing a dedicated database. A bearer network resource manager acquires the configured route path information when being activated, and selects a proper route path from the pre-configured route path information after receiving a connection resource request or a connection resource response, so that establishment and selection of route path are completely separated. Here, the configured route path information can be placed in a route table with entry routers and exit routers as column items and row items respectively. The table can be a route table indicating relationship between ER and BR, or be one indicating relationship between BRs.

In the present embodiment, data transmission is implemented via a network based on the Diff-serv model shown in FIG. 1. The route in the bearer control layer of this model comprises signaling route between bearer network resource managers, i.e. inter-domain route, and service route between CNs, i.e. intra-domain route. As shown in FIG. 1, bearer network resource manager 1 is the source bearer network resource manager, and bearer network resource manager 2, which can be called midway bearer network resource manager, is the bearer network resource manager through which the current request passes other than bearer network resource manager 1 or the destination bearer network resource manager, and bearer network resource manager 3 is the destination bearer network resource manager. Management domains 105, 106 and 107 are respectively managed by bearer network resource managers 1, 2 and 3. There can be several midway bearer network resource managers, and there can be none also. There is only one midway bearer network resource manager in the present embodiment.

In the present embodiment, route path information required by bearer network resource manager must be pre-configured. Here, route path information includes LSP information and route information. Here, LSP information denotes specific path information, and route information denotes a kind of constraint information for service routing, which indicates corresponding relationship between LSP identifier and each of user's IP address, flow information, bandwidth information and service type information. Since the present embodiment mainly concerns LSP information, it will be illustrated mainly in terms of LSP information hereinafter.

There are two ways to pre-configure LSP information as follows.

One way is to statically configure LSP information in a bearer network resource manager, namely a network administrator statically configures LSP information in a bearer network resource manager. The statically configured LSP information comprises both information of LSPs which are already established in the bearer network and information of LSPs which are not established yet. If the LSP is not established, a bearer network resource manager sends a request to a CN in the bearer network. After receiving this request, the CN establishes an LSP in the bearer network according to LSP information in the request and returns a response indicating a successful establishment; or the bearer network resource manager transmits this configured LSP information to the CN and the CN establishes the LSP, if LSP is successfully established, the CN will return a response indicating the successful establishment; otherwise, the CN will return a failure message requesting to delete this configured LSP information.

The other way is to utilize a dedicated database to configure LSP information. In this method, a dedicated route path information database is established, in which information of LSPs which are already established in the bearer network and information of LSPs which are not established yet is configured, and the LSP information real-timely reported by a CN in the bearer network is received and stored in this route path information database.

If the route path information database stores information of the not-established LSPs in the bearer network, it will send a request to the CN in the bearer network. After receiving this request, the CN establishes an LSP in the bearer network according to LSP information in the request and returns a response indicating a successful establishment; or the bearer network resource manager transmits this configured LSP information to the CN and the CN establishes the LSP, if LSP is successfully established, the CN will return a response indicating the successful establishment; otherwise, the CN will return a failure message requesting to delete this configured LSP information.

To clearly describe the pre-configured LSP information, contents of LSP information are presented in form of a matrix table in the present embodiment.

The LSP information comprises intra-domain LSP information of the current bearer network resource manager and inter-domain LSP information between the current bearer network resource manager and the next hop bearer network resource manager. The intra-domain LSP information is stored in an intra-domain LSP matrix table, and the inter-domain LSP information is stored in an inter-domain LSP matrix table.

Figure 12:
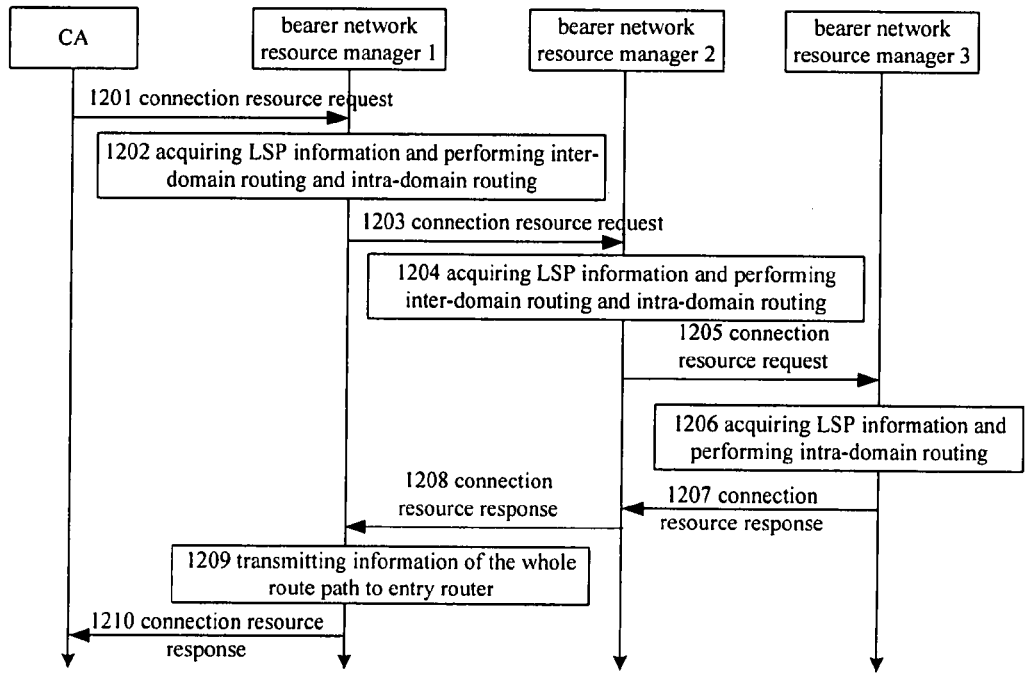
FIG. 12 illustrates a flow of configuring route path information and allocating resources by a bearer network resource manager according to a third embodiment of the present invention.

After receiving a connection resource request or a connection resource response, a bearer network resource manager selects proper LSP information for the user's call service from the configured LSP information, and reserves bandwidth resources on the LSP for this call service. FIG. 12 illustrates a flow of configuring route path information and allocating resources by a bearer network resource manager. As shown in FIGS. 1 and 12, the procedure of selecting a route path from a source bearer network resource manager to a destination bearer network resource manager is as follows.

In step 1201, a CA receives a call request sent by a user and sends a connection resource request to bearer network resource manager 1. The connection resource request includes connection information, QoS parameters, service type and so on. The connection information includes session ID, IP address or domain name of the calling party as well as IP address or domain name of the called party. The QoS parameter includes flow descriptor and bandwidth requirement information.

In step 1202, after receiving the connection resource request sent by the CA, bearer network resource manager 1 selects, according to IP address or domain name of the calling party in this connection resource request, an ER corresponding to IP address or domain name of the calling party from management domain 105 and takes this ER as entry router of the whole LSP, the entry router generally means a calling end office router or a calling tandem office router, here it is ER1. In the present embodiment, specific content of intra-domain LSP information in management 105 can be seen from the matrix table shown in table 1. Here, ER3 and BR5 are not presented in FIG. 1.

TABLE 1

| Entry | Exit | | | |
|---|---|---|---|---|
| | ER1 | ER3 | BR1 | BR5 |
| ER1 | — | {(LSPa)} | {(LSP1)} | {(LSP6)} |
| ER3 | {(LSPb)} | — | {(LSP5), (LSPb, LSP1)} | {(LSPb, LSP6)} |
| BR1 | {(LSP2)} | {(LSP7)} | — | |
| BR5 | {(LSP8)} | {(LSP9)} | | — |

It can be seen from table 1 that there are three LSPs taking ER1 as entry router: LSPa, LSP1 and LSP, from which one will be selected with a special method, comprising: utilizing load sharing principle, polling manner or priority configured according to service requirements. Here, the load sharing principle means to equalize loads of all LSPs and preferentially select the LSP with less loads; the polling manner means to select a selectable LSP in order; utilizing priority configured according to service requirements is selecting corresponding LSP according to special requirements based on service priority.

Supposing that LSP1 is selected and exit router of LSP1 is BR1; and bandwidth resources are reserved in LSP1 according to QoS parameters in the connection resource request.

Bearer network resource manager 1 takes BR1 as entry router of inter-domain LSP between management domains 105 and 106, and selects an inter-domain LSP between management domains 105 and 106 from an intra-domain LSP matrix table shown in table 2 in which BR6 and BR7 are not shown in FIG. 1. This inter-domain LSP matrix table and the intra-domain LSP matrix table can be integrated into one table.

TABLE 2

| Entry | Exit | | | |
|---|---|---|---|---|
| | BR1 | BR2 | BR6 | BR7 |
| BR1 | — | {(LSP3)} | — | {(LSP10)} |
| BR2 | {(LSP4)} | — | {(LSP13)} | {(LSP15)} |
| BR6 | — | {(LSP12)} | — | — |
| BR7 | {(LSP11)} | {(LSP14)} | | — |

It can be seen from table 2 that there are two LSPs taking BR1 as entry router: LSP3 and LSP10, and then corresponding LSP is selected by adopting load sharing principle or polling manner or priority configured according to service requirements. Supposing that LSP3 is selected and exit router of LSP3 is BR2, and certain bandwidth resources are reserved in LSP3 according to QoS parameters in the connection resource request.

In step 1203, bearer network resource manager 1 sends a connection resource request to bearer network resource manager 2. The connection resource request includes original QoS parameters, service type and connection information. Here, the connection information further includes address of bearer network resource manager 2 and that of BR2.

In step 1204, bearer network resource manager 2 receives the connection resource request sent by bearer network resource manager 1, and takes BR2 in this connection resource request as entry router of intra-domain LSP of management domain 106, and then selects an intra-domain LSP of management domain 106 from the intra-domain LSP matrix table of bearer network resource manager 2 with the same method as that used in step 1202. Supposing that LSP16 is selected and exit router of LSP16 is BR3, and certain bandwidth resources are reserved in LSP16 according to QoS parameters in the connection resource request.

Bearer network resource manager 2 takes BR3 as the entry router of the inter-domain LSP between management domains 106 and 107, and selects an inter-domain LSP between management domains 106 and 107 from the inter-domain LSP matrix table of bearer network resource manager 2 with the same method as that used in step 1202. Supposing that LSP17 is selected and exit router of LSP17 is BR4, and certain bandwidth resources are reserved in LSP17 according to QoS parameters in the connection resource request.

In step 1205, bearer network resource manager 2 sends a connection resource request to bearer network resource manager 3. The connection resource request includes original QoS parameters, service type and connection information. Here, the connection information further includes address of bearer network resource manager 3 and that of BR4.

In step 1206, bearer network resource manager 3 receives the connection resource request sent by bearer network resource manager 2, and takes BR4 in this connection resource request as entry router of intra-domain LSP of management domain 107, and then selects an ER corresponding to IP address or domain name of the called party in management 107 and takes this ER as exit router of the whole LSP, the exit router generally refers to a called end office router or a called tandem office router, here it is ER2. Bearer network resource manager 3 takes ER2 as exit router of the intra-domain LSP of management domain 107, and selects an intra-domain LSP of management domain 107 from intra-domain LSP matrix table of bearer network resource manager 3 with the same method as that used in step 1202. Supposing that LSP18 is selected, and certain bandwidth resources are reserved in LSP18 according to QoS parameters in the connection resource request.

In step 1207, bearer network resource manager 3 returns a connection resource response to bearer network resource manager 2, the connection resource response including information of BR4 and LSP18.

In step 1208, bearer network resource manager 2 receives the connection resource response returned by bearer network resource manager 3, confirms the bandwidth resources reserved by bearer network resource manager 2 for this request, and sends a connection resource response to bearer network resource manager 1. The connection resource response includes information of BR2, information of LSP18 in the connection resource response returned by bearer network resource manager 3, information of LSP16 and LSP 17 selected by bearer network resource manager 2.

In step 1209, bearer network resource manager 1 receives the connection resource response returned by bearer network resource manager 2, confirms the bandwidth resources reserved for this request by bearer network resource manager 1, and completes the selection of LSP path aggregate for this request. The LSP path aggregate includes: LSP18, LSP17 and LSP 16 in the connection resource response received by bearer network resource manager 1, LSP3 and LSP1 selected by bearer network resource manager 1. Then, bearer network resource manager 1 transmits this LSP path aggregate as well as connection information and QoS parameters in the connection resource request to ER1 by means of a stream mapping command and completes resource allocation, so that ER1 obtains the LSP information allocated by bearer control network for the current call.

Figure 13:
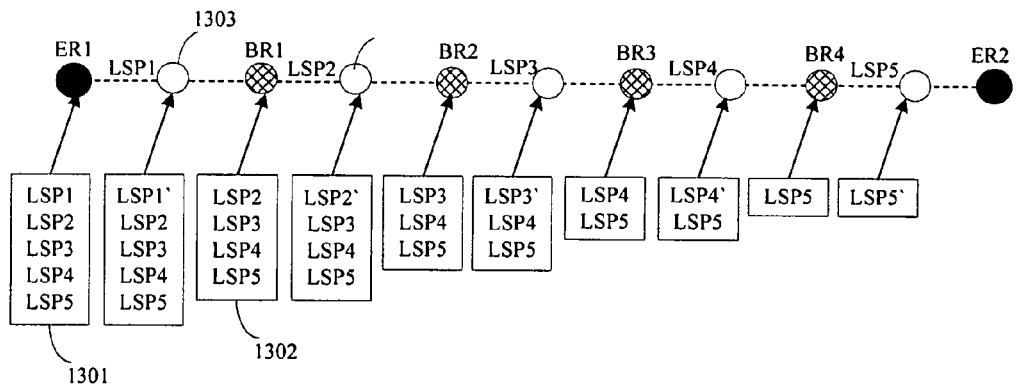
FIG. 13 is a schematic diagram illustrating route selection procedure in a bearer control layer according to the third embodiment of the present invention.

As shown in FIG. 13, ER1 acquires LSP information 1301 of the current call, wherein information 1301 includes LSP1, LSP2, LSP3, LSP4 and LSP5. The LSP selected in the above step is from ER1 to BR1 via LSP1. Label information of LSP1 is modified to LSP1' while the LSP passes through core router 1303, LSP information 1302 arriving at BR1 includes LSP2, LSP3, LSP4 and LSP5. The LSP then travels from BR1 to BR2 via LSP2, label information of LSP2 is modified to LSP2' while the LSP passes through core router 1304. LSP information 1303 arriving at BR1 includes LSP3, LSP4 and LSP5. The rest may be deduced by analogy, that is, the LSP then travels from BR2 to BR3 via LSP3, and then to BR4 via LSP4, finally to ER2 via LSP5. Thus the calling party can send information to the called party through this LSP.

In step 1210, after receiving a stream mapping command response from ER1, bearer network resource manager 1 sends a connection resource response to the CA, indicating successful acquisition of LSP information and successful resource allocation.

Figure 14:
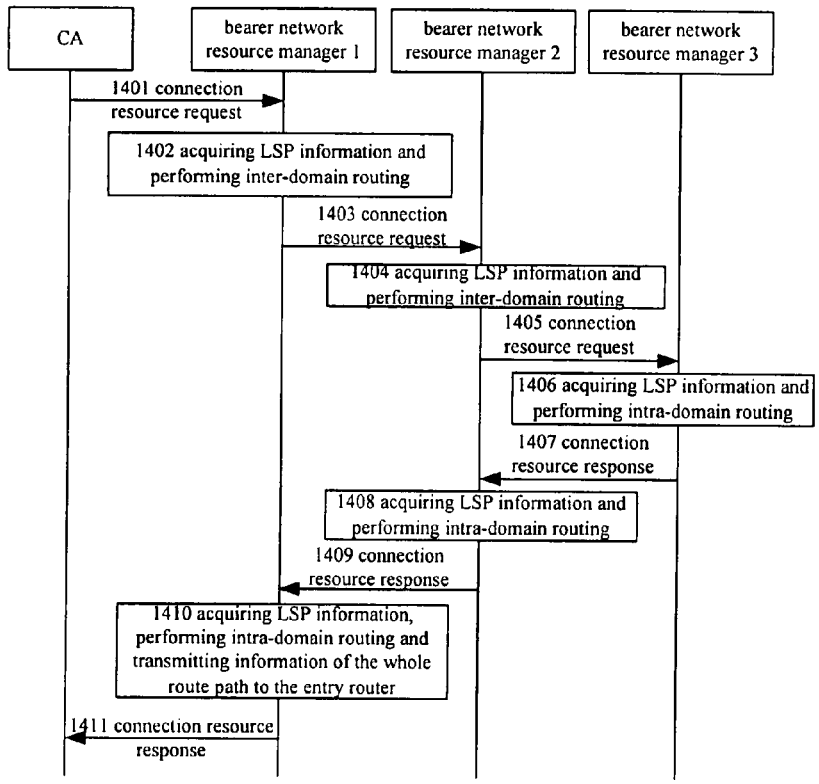
FIG. 14 illustrates another flow of configuring route path information and allocating resources by a bearer network resource manager according to the third embodiment of the present invention.

FIG. 14 illustrates another flow of configuring LSP information and allocating resources by a bearer network resource manager according to the present embodiment. In this flow, specific method is similar with that illustrated in FIG. 12, the only difference being that bearer network resource manager firstly selects an inter-domain LSP and then selects an intra-domain LSP after receiving a connection resource response. Therefore, steps of this flow will be briefly illustrated, as shown in FIG. 14, this routing procedure is as follows.

In step 1401, a CA sends a connection resource request to bearer network resource manager 1.

In step 1402, bearer network resource manager 1 selects an inter-domain LSP between management domains 105 and 106.

In step 1403, bearer network resource manager 1 sends a connection resource request to bearer network resource manager 2.

In step 1404, bearer network resource manager 2 selects an inter-domain LSP between management domains 106 and 107.

In step 1405, bearer network resource manager 2 sends a connection resource request to bearer network resource manager 3.

In step 1406, bearer network resource manager 3 selects an intra-domain LSP of management domain 107 from an intra-domain LSP matrix table.

In step 1407, bearer network resource manager 3 returns a connection resource response to bearer network resource manager 2.

In step 1408, bearer network resource manager 2 selects an intra-domain LSP of management domain 106 from an intra-domain LSP matrix table.

In step 1409, bearer network resource manager 2 returns a connection resource response to bearer network resource manager 1.

In step 1410, bearer network resource manager 1 selects an intra-domain LSP of management domain 105 from an intra-domain LSP matrix table, transmits the whole LSP path aggregate as well as connection information and QoS parameters in the connection resource request to an entry router, and completes resource allocation.

In step 1411, bearer network resource manager 1 returns a connection resource response to the CA.

Since the LSP information required by bearer network resource managers is pre-configured in the present embodiment, when a bearer network resource manager selects LSP or allocating LSP and bandwidth resources for a client's call service, it will acquire LSP information from bearer network resource managers directly, and select a proper LSP for the current call from the LSP information. So LSP information can be repeatedly used, thereby decreasing routing load of bearer network resource managers, increasing routing efficiency and maintaining network stability. In addition, there is no priority restriction for the LSP information configured in bearer network resource managers, thus routing and resource allocation can be completed with flexibility and high efficiency.

The Fourth Embodiment

Label Switching Routing Manner

The present scheme adopts Diff-serv model shown in FIG. 1 to implement data transmission, wherein the bearer control layer route of this model comprises: signaling routes between bearer network resource managers and service routes between CNs, the service route specifically comprising intra-domain routes and inter-domain routes. There are two aspects to determine routes in the bearer network resource manager: one aspect is to determine routes between bearer network resource managers and determine the next hop bearer network resource manager, thus establishing a signaling route path; another aspect is that each bearer network resource manager determines route path for each service in bearer layer, thus establishing a service route path. Here, the CN may be ER, BR and other routers such as switching routers.

Figure 15:
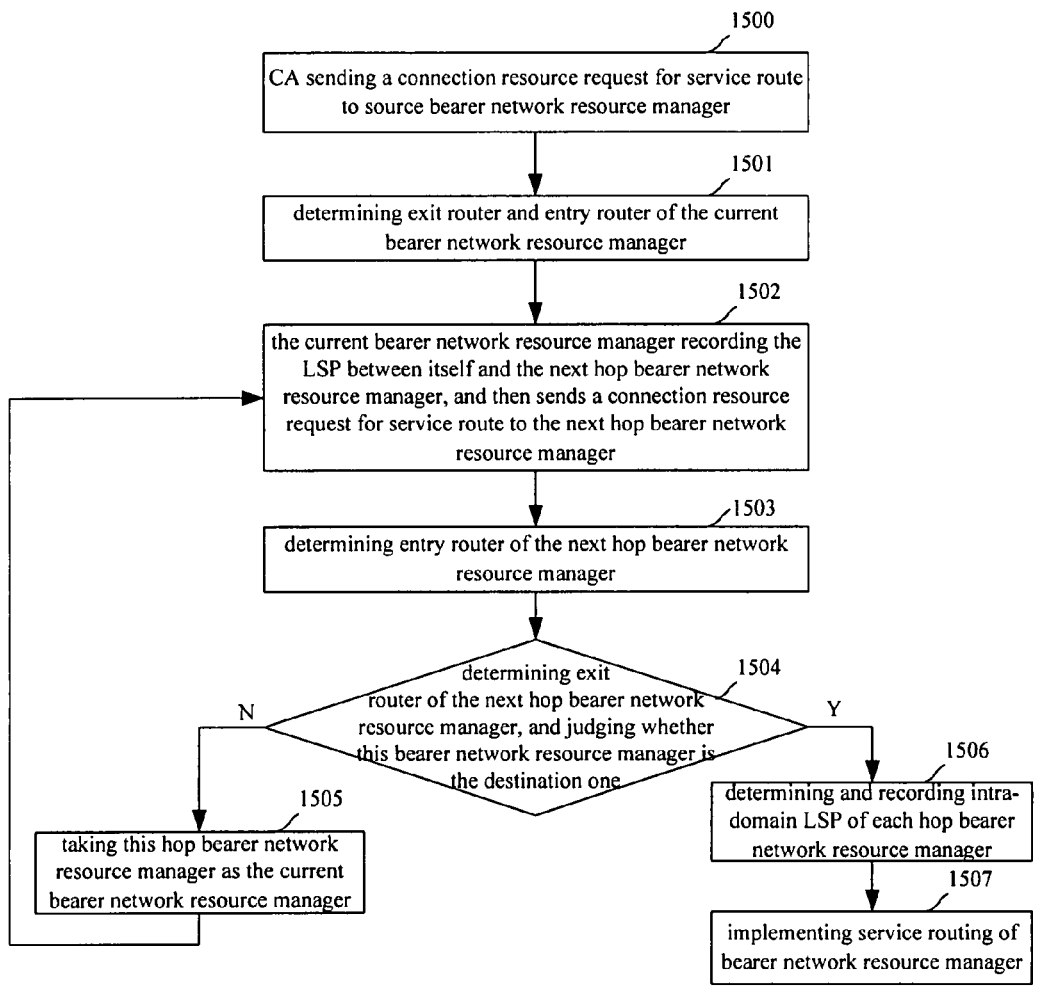
FIG. 15 is a flowchart of route selection by a bearer network resource manager according to a fourth embodiment of the present invention.

FIG. 15 is a flowchart of routing by a bearer network resource manager according to the present routing manner. The specific steps are as follows.

In step 1500, a CA sends a connection resource request to a source bearer network resource manager, the connection resource request including destination IP address or domain name of this user.

In step 1501, according to this IP address or domain name, the bearer network resource manager whose end office router/tandem office router accesses the service initiated by the CA is determined and the exit router of this service in the source bearer network resource manager is determined. BR of this source bearer network resource manager can be determined according to information such as service type and service parameters in the connection resource request sent by the CA, as well as route information in the source bearer network resource manager. The route information of this source bearer network resource manager can be preset and stored in the source bearer network resource manager, or be reported to the source bearer network resource manager by the CN in the source bearer network resource manager.

In step 1502, a bearer network resource manager performs inter-domain routing between the current bearer network resource manager and the next hop bearer network resource manager for the service initiated by the CA. While performing inter-domain routing between the current bearer network resource manager and the next hop bearer network resource manager for the service initiated by the CA, an available LSP can be determined according to the service's service type, resource availability status, priority, configured routing strategy and QoS requirements, and certain bandwidths are reserved on this LSP in the current bearer network resource manager for this application. The current bearer network resource manager sends a connection resource request to the next hop bearer network resource manager, the request including entry router of the inter-domain route path to the next hop bearer network resource manager, QoS parameters and service type of this service, as well as destination IP address of the next hop bearer network resource manager.

In step 1503, according to the selected exit router of LSP in the bearer network resource manager in step 1502, an entry router of the next hop bearer network resource manager is determined, and information of this router is carried in the connection resource request message to be sent to the next hop bearer network resource manager.

In step 1504, an exit router of the next hop bearer network resource manager is determined, according to service type and service parameters in the connection resource request sent by the previous hop bearer network resource manager as well as route information of the current bearer network resource manager. It is judged whether this bearer network resource manager is the destination bearer network resource manager, namely end office router/tandem office router, if so, step 1506 will be executed; otherwise, step 1505 will be executed.

In step 1505, this bearer network resource manager is taken as the current bearer network resource manager, and then step 1502 will be executed.

In step 1506, after inter-domain LSP routing between bearer network resource managers is completed, according to intra-domain entry router and intra-domain exit router of each bearer network resource manager, intra-domain LSP of each bearer network resource manager is determined, a bearer network resource manager will apply for bandwidth resources and record the LSP resource information, and then transmit the LSP resources recorded by itself and the next hop bearer network resource manager to its previous hop bearer network resource manager by means of a connection resource response, until the response arrives at the source bearer network resource manager.

In step 1507, the source bearer network resource manager selects an intra-domain LSP of this bearer network resource manager as intra-domain route path, and starts a stream mapping command, sends to an ER session ID, stream information, QoS parameters, flow descriptor as well as the whole LSP path aggregate of this service from the source bearer network resource manager to the destination bearer network resource manager, thus completing routing between bearer network resource managers for this service.

When applying the method according to the present embodiment to perform intra-domain LSP routing of a bearer network resource manager, different routing algorithms can be adopted. For instance, a method of pre-calculating route path can be adopted, comprising: presetting an intra-domain route table of a bearer network resource manager and determining an LSP by looking up BR and ER of this bearer network resource manager in the table; hop-by-hop route algorithm can be adopted, comprising: selecting an LSP from a certain intra-domain CN to other CN, and repeating this procedure until an exit router of this LSP is a certain BR in this management domain; matrix route algorithm can be adopted, comprising: presetting an intra-domain route table of bearer network resource manager and determining an LSP by looking up BR of this bearer network resource manager in the table. In addition, Dijakstra algorithm, Bellman-Ford algorithm or static configuration algorithm can be adopted also.

When applying the method according to the present embodiment to perform inter-domain routing of bearer network resource manager, different route algorithms can be adopted. For instance, hop-by-hop route algorithm can be adopted, comprising: selecting an LSP from a certain inter-domain BR to other CN, and repeating this procedure until an exit router of this LSP is a BR of a certain bearer network resource manager.

Although intra-domain routing and inter-domain routing for bearer network resource manager are independent, they are also inseparable, namely, after receiving a connection resource request, a bearer network resource manager has not only to determine an intra-domain LSP of this bearer network resource manager but also to determine an inter-domain LSP between itself and the next hop bearer network resource manager.

The routing method according to the present embodiment will be described with reference to a specific example and FIG. 5 which is a schematic diagram illustrating routing by a bearer network resource manager.

There are ER1, ER2, BR1 and BR2 in the domain of bearer network resource manager 1, there are BR3, BR4, ER3 and ER4 in the domain of bearer network resource manager 2, and there are other CNs (not shown in FIG. 5) as well as in-between LSPs (not shown in FIG. 5) in the domains of both bearer network resource managers 1 and 2. The routes between bearer network resource managers 1 and 2 includes LSP11, LSP12, LSP13 and LSP14.

When receiving a connection resource request sent by the CA with IP address as 10.1.0.0/16, bearer network resource manager 1 will determine entry router as ER1 according to IP address of this request, and then determine exit router as BR1 according to destination address, service type and service parameters of this connection resource request. The service parameters may comprise bandwidth requirements, priority and so on. If bearer network resource manager 1 detects that both LSP11 and LSP22 can arrive at bearer network resource manager 2, according to service type, resource availability status, priority, configured routing strategy and QoS requirements of this service initiated by the CA, it will determine an available LSP and record it, for example, LSP11 is selected as the inter-domain route path from BR1 to BR3 and thus entry router of bearer network resource manager 2 is determined as BR3. Bearer network resource manager 1 sends a connection resource request to bearer network resource manager 2, and bearer network resource manager 2 learns that its exit router is ER4 according to route information of itself. And then, bearer network resource manager 1 selects an LSP according to ER1 and BR1 and records the LSP, and bearer network resource manager 2 selects an intra-domain route path of LSP according to BR3 and destination address of the service in the request, for example ER4. Finally, bearer network resource manager 2 returns a connection resource response to bearer network resource manager 1, the response including intra-domain LSP of bearer network resource manager 2, so that bearer network resource manager 1, namely the source bearer network resource manager, can get service route path of this CA and complete routing between bearer network resource managers for this CA.

The method provided in the present embodiment is applicable to networks with complex structure, wherein inter-domain routes between bearer network resource managers are determined firstly and then intra-domain routes of the bearer network resource manager are selected. Intra-domain routing and inter-domain routing of a bearer network resource manager can be performed respectively with different routing algorithms according to factual situations, so as to guarantee that data are well transmitted between bearer network resource managers and that network resources of bearer network resource manager are reasonably used, with higher routing success ration, easy implementation and convenient maintenance.

The Fifth Embodiment

Routing Manner with Virtual Destination User Address Segment

There are border routers in an independent operation network generally. The border outers are used to connect with border routers of other independent operation networks and realize interconnection between independent operation networks. When an independent operation network is established, in the present embodiment, a virtual destination user having destination user address segment information cross independent operation networks is preset in a bearer network resource manager. This bearer network resource manager manages border routers in the current independent operation network, and the preset virtual destination user is bonded with a border router. Meanwhile, a route to the real destination user is configured in the gateway of destination independent operation network, and gateway of this destination independent operation network is connected to this border router of the current resource manager.

There can be multiple border routers in an independent operation network, so virtual destination user and corresponding border router must be bonded together, and the corresponding border router is connected to a gateway of destination independent operation network that manages the real destination user. In this way, the resource manager of the current independent operation network can determine a virtual destination user of the current independent operation network according to the transmitted destination address of the service cross independent operation networks, thus determine the border router that is connected to this virtual destination user, and allocate a route in the current independent operation network from the user sending the service to this border router.

In the present embodiment, the destination user address segment set by virtual destination user can be either one address or a segment of addresses.

When a bearer network resource manager in a bearer control layer receives a connection resource request cross independent operation networks sent by a user of the current independent operation network via a service server, the bearer network resource manager of this independent operation network determines that this service is to be sent to a virtual destination user according to destination address of the service in this request, thus obtains the border router that bonds this independent operation network with the virtual destination user to which this service is sent. According to QoS property, destination address and source address, the bearer network resource manager allocates network resources and route in the bearer layer of this independent operation network from the user sending the request to this border router, this service is transmitted to this border router of the current independent operation network according to the allocated network resources and route in the bearer layer of this independent operation network. This border router of the current independent operation network transmits this service to a gateway of the destination independent operation network, and the gateway of the destination independent operation network transmits this service to the real destination user according to the preset route.

When the border router of the current independent operation network is connected to border routers of multiple independent operation networks, because a table of corresponding relation between address segment information of destination user and gateways of destination network is preset in the border router of the current independent operation network in the prior art, the border router of the current independent operation network can look up this table according to destination address of the service, determine the gateway of the destination independent operation network to which this service is to be sent, and then send this service to the determined gateway of the destination independent operation network.

When the destination independent operation network is a bearer network with QoS guarantee, the gateway in the destination independent operation network is a border router. Alternatively, no route from border router to destination user is preset in destination independent operation network, but bearer control layer performs routing according to destination address and QoS parameters of the service to be transmitted by border router and allocates bearer resources and route according to the current status of the destination independent operation network, and then the border router transmits this service to the destination user according to this allocated bearer resources and route.

Figure 16:
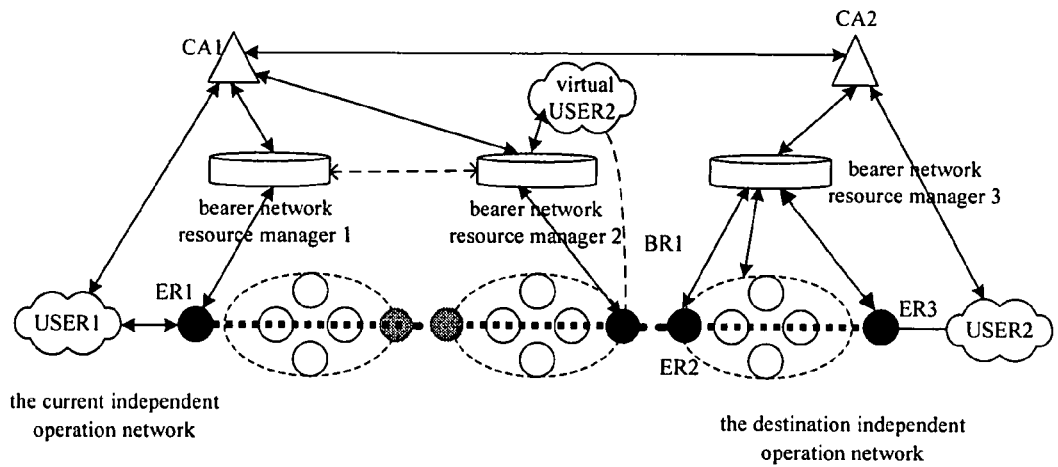
FIG. 16 is a schematic diagram illustrating network structure for implementing route selection cross independent operation networks according to a fifth embodiment of the present invention.

This route selection scheme will be described with reference to a specific embodiment and FIG. 16 which is a schematic diagram illustrating network structure for implementing routing cross independent operation networks according to the present routing scheme. Here, both the current independent operation network and the destination independent operation network are of QoS guarantee. As shown in FIG. 16, supposing that USER1 of the current independent operation network transmits data to USER2 of the destination network, bearer network resource managers 1 and 2 of the current independent operation network control resource allocation and routing of the bearer layer of the current independent operation network, while bearer network resource manager 3 of the destination independent operation network controls resource allocation and routing of bearer layer of the destination independent operation network. USER1 is connected to border router ER1 of the current independent operation network as well as to service server CA1, a virtual USER2 of the destination user cross independent operation networks is set in bearer network resource manager 2 of the current independent operation network, and is bonded with BR1. Bearer network resource manager 2 controls BR1 according to the set virtual USER2, BR1 is connected to ER2 of the destination independent operation network, real USER2 in the destination independent operation network is connected to both ER3 and CA2, and CA1 is connected to CA2.

Figure 17:
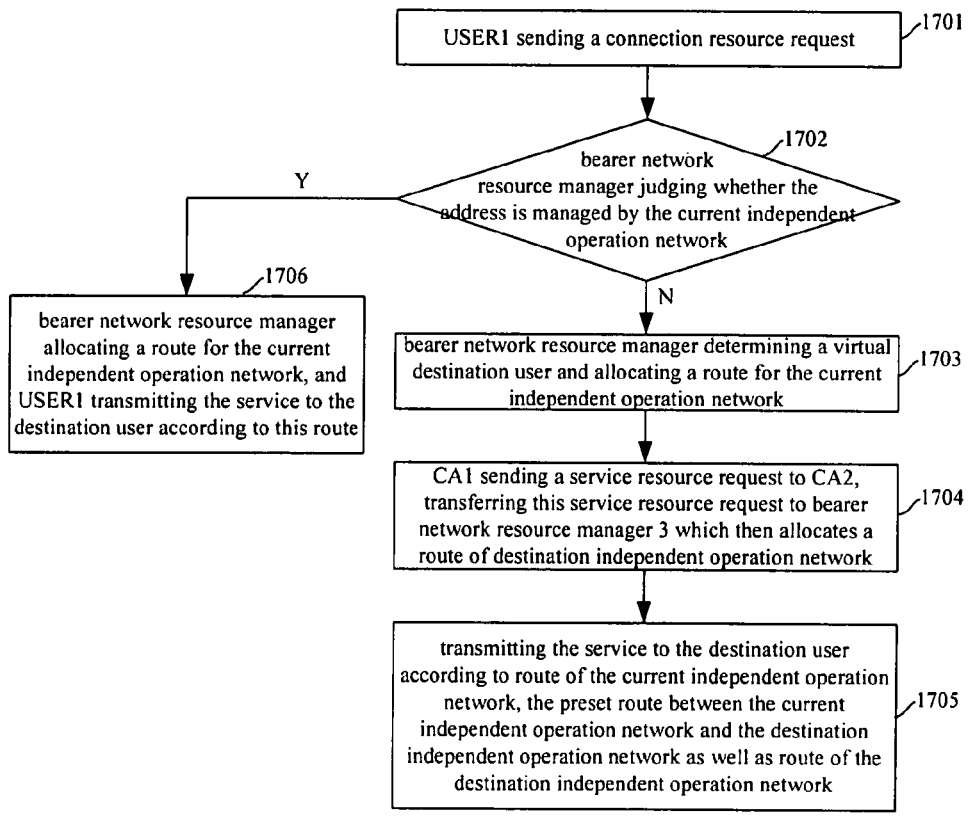
FIG. 17 is a flowchart of route selection cross independent operation networks according to the fifth embodiment of the present invention.

As shown in FIG. 17, by adopting the network structure shown in FIG. 16, the procedure of implementing routing cross independent operation networks comprises the steps as follows, supposing that USER1 sends a service to USER2.

In step 1700, USER1 sends a connection resource request to bearer network resource manager 1 via CA1, the request including information such as QoS parameters, source address and destination address of this service.

In step 1701, after receiving this request, bearer network resource manager 1 negotiates with other bearer network resource managers in the current independent operation network, judges whether the destination address included in this request is an address managed by the current independent operation network, if so, step 1702 will be executed; otherwise, step 1703 will be executed. Here, the procedure of bearer network resource manager 1 negotiating with other bearer network resource managers in the current independent operation network can be negotiation between bearer network resource managers 1 and 2, and the negotiation can be implemented with any technique in the prior art.

In step 1702, according to information of QoS parameters, source address and destination address of this service, bearer network resource manager 1 and other bearer network resource managers in the current independent operation network allocate bearer layer resources and route for this service, and the service sent by USER1 is transferred to the user with destination address according to the allocated bearer layer resources and route through the bearer layer.

In step 1703, in the case this destination address is managed by another independent operation network, bearer network resource manager 1 and other bearer network resource managers in the current independent operation network determine the preset virtual USER2 according to QoS parameters, source address and destination address of this service, thus determine border router BR1 of the current independent operation network which is bonded to virtual USER2 and to which this service is to be sent, allocate bearer layer resources and route in the current independent operation network between USERS which sends this request to border router BR1 for this service.

The procedure of determining the preset virtual USER2 may comprise judging whether destination address of this service is in the address segment of virtual USER2.

In step 1704, after routing of the current independent operation network is finished, the route from border router BR1 of the current independent operation network to border router BR2 of the destination independent operation network is determined according to the preset corresponding relationship table, and finally CA1 sends a service resource request to CA2. The service resource request is forwarded to bearer network resource manager 3 of the destination independent operation network, and then bearer network resource manager 3 allocates network resources and route from ER2 to USER2 in the destination independent operation network for this service according to QoS parameters, source address and network segment information of ER2 of this service.

In step 1705, according to the bearer layer resources and route from the user sending this request to border router BR1 allocated in step 1704, the route set between BR1 of the current independent operation network to ER2 of the destination independent operation network, and the bearer layer resources and route from edge router ER2 to destination user USER2 allocated by the destination independent operation network, the service sent by USER1 is transmitted to destination user USER2 via border router BR1 of the current independent operation network in bearer layer and ER2 of the destination independent operation network.

Destination independent operation network can also be another network without QoS guarantee, such as an IP network. In this case, the service sent to destination independent operation network is transmitted to destination user according to the route set by the destination independent operation network itself.

The method provided in the present embodiment can establish a communication path with QoS guarantee on bearer control layer, and can shield topology structures of different independent operation networks, thus realizing transmission of services with QoS guarantee cross independent operation networks.

In the present embodiment, a virtual destination user with address segment information is set in resource manager of the current independent operation network. When a user of the current independent operation network sends a service to a destination user of another independent operation networks, the resource manager of the current independent operation network determines the virtual destination user according to destination address carried in the service, then according to QoS parameters, source address and destination address of this service, the resource manager can allocate route and bearer resources to the virtual destination user for this service. This service is then transmitted to virtual destination user according to the allocated route and bearer resources, the border router with network segment information of virtual destination user transfers this service to a gateway of the destination independent operation network, and the gateway of the destination independent operation network transfers this service to the real destination user according to the preset route. Therefore, routing of a service with QoS guarantee cross independent operation networks can be realized with the present embodiment.

The Sixth Embodiment

Combination of E.164 Addressing and IP Route Addressing

IP address route manner is to perform addressing through destination IP address included in an IP packet, the IP address being the unique address allocated for each host computer connected to the Internet. FIG. 18 shows IP datagram format of IPv4, as shown in FIG. 18, an IP datagram is composed of head and data. As to IPv4, four bytes in the head are used to indicate IP address of destination station, and an IP route just utilizes this IP address of destination station for addressing, wherein the network is found firstly according to net-id in IP address of destination station, and then the host is found according to host-id.

The method of addressing bearer path in a bearer network by utilizing IP address manner in a network with bearer control layer is right the method of addressing according to IP address in bearer control server. The stored route information is generally IP route table information with IP address as addressing destination, and the route table is used to select a bearer network bearer path.

Although IP address structure makes it convenient to address on the Internet, IP address cannot reflect any geographical information concerning the host's location. Current networks are all established in terms of geographical locations, so the number of IP route tables in the current network is dependent on aggregation degree of IP address which denotes capability of combining IP addresses in terms of network segments. Capability of IP address aggregation will be poorer and poorer with new IP segments being added, and increase of the number of IP route tables will make IP route stability poorer, and will increase time span and difficulty of IP route addressing.

E.164 is a kind of labeling and addressing manner in the current telecommunication network, and is widely applied in Public Switched Telephone Network (PSTN) and Integrated Service Digital Network (ISDN). E.164 is a kind of user number that comprises geographical information of user's location, but it is not applied in IP network at present.

Core idea of the present routing scheme is to divide the network into multiple different management areas and adopt different control manners upon routing, specifically, selecting a route between different management areas according to E.164 addressing manner and selecting a route inside a management area according to IP route addressing manner.

Figure 19:
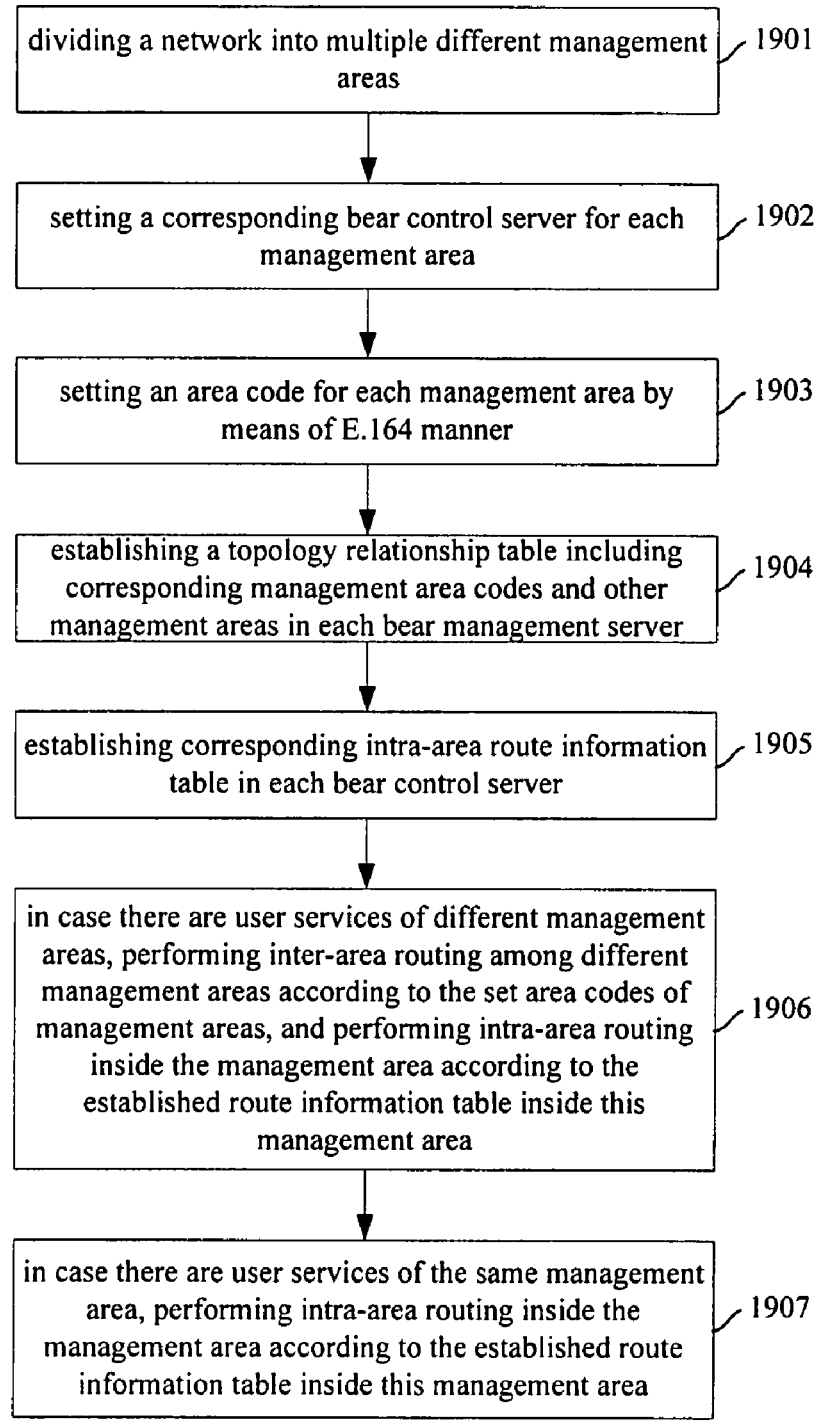
FIG. 19 is a flowchart of network route control method according to the fifth embodiment of the present invention.

With reference to FIG. 19, the network routing procedure in the present routing scheme comprises the following steps:

Steps 1901~1902: dividing a network into multiple different management areas and setting a corresponding bearer control server for each management area. The management area can be a metropolitan area network, a provincial backbone network or a national backbone network.

Step 1903: setting an area code for each management area according to E.164 manner.

As is well known to those skilled in the art, E.164 evolves from standard telephone labeling system and it is a standard suggested by ITU-T for international telecommunication labeling, especially for labeling in ISDN, Switched Multimegabit Data Service (SMDB) and broadband ISDN. An E.164 number is composed of the following elements: country code (1~3 digits), area code (n digits) and telephone number (15~n digits). An E.164 number comprises geographical location information and a telecommunication network is established according to geographical location, which makes network route addressing by using E.164 manner simple and fast.

If other countries also employ the same network framework to establish a cross-country network through interconnection, country codes can be specified so as to facilitate addressing between different countries.

One management area corresponds to one bearer management server, so bearer management server also has corresponding label. Therefore, by labeling different bearer management servers, corresponding management areas can obtain corresponding area codes.

Step 1904: establishing a topology relationship table including corresponding management area codes and other management areas in each bearer control server. The table comprises: destination area code, the next hop area code, the path and other information, the table is used to store route information between this management area and other management areas inside the network.

Step 1905: establishing corresponding intra-area route information table of a management area in each bearer control server. The table comprises: destination IP address, the next hop path and other information. The table is used to store the configured route information of this management area.

Step 1906: in case there are user services of different management areas, inter-area routing among different management areas is performed according to the set area codes of management areas, and intra-area routing inside the management area is performed according to the established route information table inside this management area.

Step 1907: in case there are user services of the same management area, intra-area routing inside the management area is performed according to the established route information table inside this management area.

The route control manner in step 1906 will be described in detail hereinafter with reference to a call procedure of users in different management areas.

Figure 20:
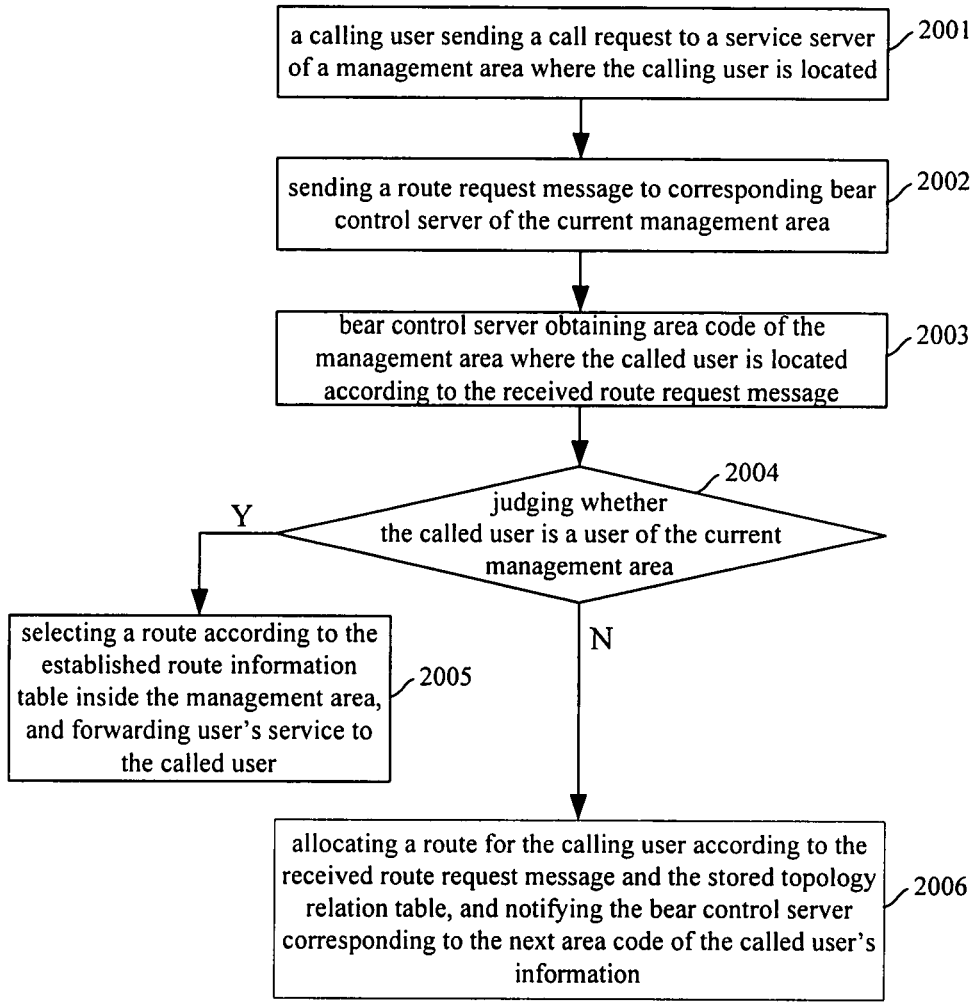
FIG. 20 is a flowchart illustrating a call procedure between users in different management areas according to the fifth embodiment of the present invention.

As shown in FIG. 20, the call procedure of users in different management areas comprises the following steps.

In step 2001, the calling user sends a call request to a service server of a management area where the calling user is located. The call request includes area code of the management area where the called user is located and a called user number.

In step 2002, after receiving the call request, the service server sends a route request message to a corresponding bearer control server of the current management area according to this call request. This route request message includes: area code of the management area where the calling user is located, the calling user number, area code of the management area where the called user is located and the called user number. The calling user number and the called user number can be allocated by any other service providers or by a prior manner, such as IP address of the calling user and that of the called user, or other internal numbers. If the calling user and the called user are in the same management area, area code of the management area where the called user is located can be omitted.

In step 2003, the bearer control server obtains area code of the management area where the called user is located according to the received route request message.

In step 2004, the bearer control server judges whether the called user is a user of the current management area, if so, step 2005 will be executed; otherwise, step 2006 will be executed.

In step 2005, a route is selected according to the established route information table inside the management area, and relevant routers are notified to forward user's service to the called user according to the selected route.

In step 2006, according to the received route request message and the stored topology relationship table, the bearer control server allocates a route for the calling user; and meanwhile notifies the bearer control server corresponding to the next hop area code of the called user's information, and then returns to step 2004 in which the bearer control server corresponding to the next area code judges whether the called user is a user of this management area.

The above step 2006 is repeated until the service is routed to the management area where the called user is located, and then the service is forwarded to the called user according to the manner in step 2005.

As is known to those skilled in the art, by utilizing independent bearer control layer, extensive update and reformation upon core equipment of a bearer network can be avoided, and processing capability of bearer control can be more powerful, secure and stable. Therefore, in order to provide better bearer control capability, bearer control servers in the current embodiment can be separated from the bearer layer, namely that bearer control servers constitute an independent bearer control layer to fulfill the control on bearer network routing.

Figure 21:
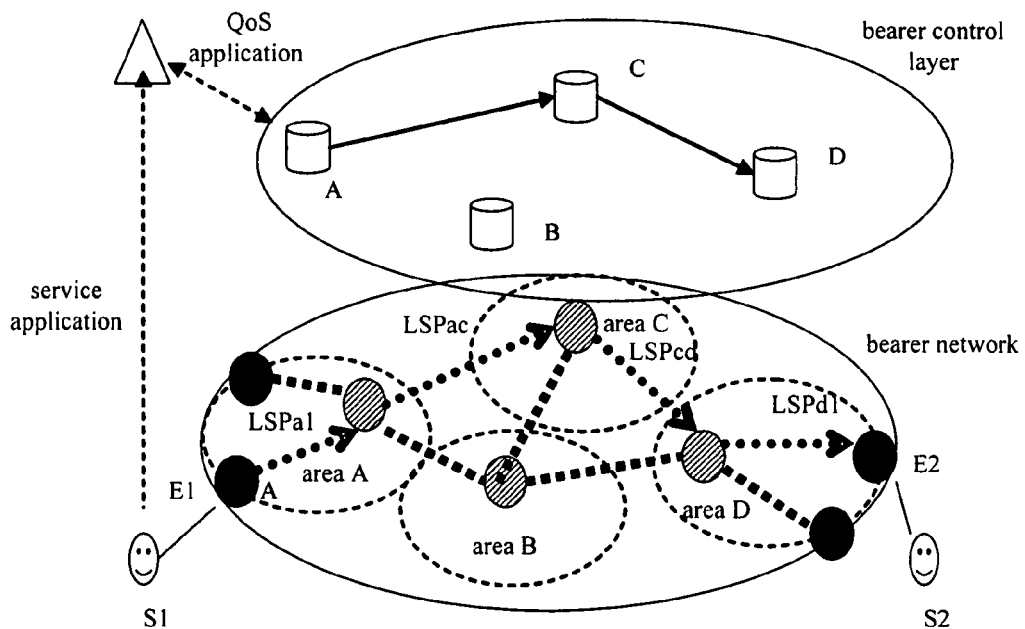
FIG. 21 illustrates control procedure of network route according to the fifth embodiment of the present invention.

Routing procedure of this method will be described hereinafter with reference to a specific application of the present embodiment. With reference to FIG. 21, supposing that there are four management areas, which are respectively management areas A, B, C and D. In the present embodiment, a bearer network resource manager is a bearer control server.

Firstly, a label planning of E.164 manner is performed upon these four management areas by allocating an area code for each management area, supposing that management areas A, B, C and D are labeled as 01, 02, 03 and 04 respectively, each management area corresponds to one bearer control server, and the servers can be called bearer control servers A, B, C and D. Therefore, bearer control servers also get corresponding labels, and the label planning can be deemed as being performed upon bearer control servers. Labels of management areas and topology relation are stored in bearer control servers, the topology relation describing interrelation between those management areas, for instance, specific configuration of bearer control server A represents that destination area 04 can be reached by way of areas 02 and 03. Routes to each management area according to area code addressing are also configured in each bearer control server, and this kind of route operates like a route that is used for switching equipment in a PSTN network to perform long distance relay routing using long distance area code. In the present example, possible label and topology relation of management areas, namely route configuration status is as follows:

| Destination area code | the next area code | path | ... |
|---|---|---|---|
| Bearer control server A: | | | |
| 04 | 02 | path 2 | ... |
| 04 | 03 | path 1 | ... |
| Bearer control server B: | | | |
| 04 | 04 | path 1 | ... |
| Bearer control server C: | | | |
| 04 | 04 | Path 1 | ... |
| Bearer control server D: | | | |
| 04 | none | none | ... |

Supposing that User S1 Initiates a Call to User S2:

1) User S1 dials number of the called user S2, wherein the dialed number comprises area code of the management area where user S2 is located, and the dialing format can be: area code of the called user+number of called user. Here, number of the called user is allocated by service providers or networks according to a prior manner, and can be IP address or other internal numbers, such as a defined number "234544" or a self-defined domain name "liyiming" etc. If the calling user and the called user are in the same management area, area code of the management area where the called user is located can be omitted.

2) The service server analyses user's request and negotiates capabilities of the two ends, such as acceptable rate, compression coding of the terminal, and then sends an application to bearer control server A after the negotiation is successful, wherein the application comprises IP addresses of the calling user and the called user, as well as area codes of the management areas where the calling user and the called user are located respectively.

3) Bearer control server A performs addressing according to area code of the called management area firstly. The addressing in the current example is from management area 01 to management area 04, which is like long distance area code addressing in PSTN. In detail, area code 03 is addressed by bearer control server A of area code 01 according to the self-recorded route to area code 04; area 04 is addressed by bearer control server of area 03 according to destination area code, so that it is addressed from source area code to the destination area code, and the path from source area to destination area is also selected accordingly, supposing the current selected path is "LSPal/LSPac/LSPcd".

4) Bearer control server D performs addressing in its own management area according to IP address of the called user. Thus E2 is addressed.

Therefore, the current selected path is "LSPal/LSPac/LSPcd/LSPdl".

5) After selecting a path for the current service, the bearer control layer sends this path to edge router E1, if it is a two-way service stream, the path should also be sent to edge router E2. The edge router encapsulates path information in a data packet header, and then edge router and intermediate router transmit the service stream according to the specified path.

In this way, the procedure of service routing and forwarding is completed.

By integrating E.164 addressing manner with IP network in the present embodiment, during the procedure of selecting a bearer path in a bearer network, by combining advantages of both E.164 and IP route addressing manner, bearer control server utilizes E.164 number and IP address at the same time, wherein bearer control server routes to the management domain where it is located through addressing with E.164 number, so that large quantity of IP addresses are shielded and routing manner to destination domain is made simple and fast. And then bearer control server locates a specific user inside the management domain by using IP address, so that various advantages of using IP address in the current IP network are reserved. Therefore, addressing is simpler and faster in large-scale network frameworks, and complexity and instability in large-scale network when simply using IP address for addressing are overcome. Meanwhile, expansion capability of the network is enhanced.

From the above-described routing procedure from the source bearer network resource manager to the destination bearer network resource manager, it can be seen that end-to-end routing mainly comprises two parts: intra-domain routing inside each bearer network resource manager and inter-domain routing between different bearer network resource managers. There are also different routing manners in terms of intra-domain routing or inter-domain routing, for instance, path matrix manner, exit/entry router IP identifier manner, constraint condition routing manner, setting routing strategy and so on. In these manners, some are applicable to both intra-domain routing and inter-domain routing, while some are only applicable to either intra-domain routing or inter-domain routing.

Specific implementing procedure and applicability of each intra-domain routing or inter-domain routing will be described hereinafter with reference to corresponding network structure of Diff-serv model.

The First Manner: Routing Manner by Adopting a Path Matrix Table

This routing manner adopts the Diff-serv model shown in FIG. 1 to implement data transmission over the network. In this model, a bearer control layer route comprises signaling route between bearer network resource managers and service route between CNs. The service route comprises inter-domain route and intra-domain route, while the present routing manner mainly concerns intra-domain route. Core idea of the present method is: establishing and maintaining a matrix table of reachable paths between intra-domain CNs in a bearer network resource manager, implementing intra-domain routing of each bearer network resource manager by using this matrix table, thus determining the intra-domain service route of each bearer network resource manager. Here, the CN can be ER, BR or other routers such as forwarding routers.

With reference to FIG. 5, bearer network resource managers 1 and 2 respectively manage metropolitan area networks 1 and 2, and each metropolitan area network comprises more than one ER or BR. Taking the management domain managed by bearer network resource manager 1 as example, there are ER1, ER2, BR1 and BR2 that can be taken as exit routers or entry routers in the management domain of bearer network resource manager 1, and there also are other intra-domain CNs as well as Label Switching Path (LSP) between them. Before the intra-domain service path routing is performed, an aggregate of those LSP paths between each exit and each entry is established beforehand inside this domain, and then intra-domain routing is performed according to this established path aggregate. In the present embodiment, this LSP path aggregate is established and stored in a matrix manner, and the procedure of establishing this LSP path aggregate is as follows:

Step 11: randomly selecting any one of ER1, ER2, BR1 and BR2, which can be taken as entry or exit, as the entry router. In the present embodiment, ER1 is selected as the entry router at first, and information of ER1 is added to an aggregate of searched routers.

Step 12: selecting an LSP from all the LSPs connected to ER1 non-repeatedly.

Step 13: judging whether the router at the other end of the selected LSP is an intra-domain BR or ER and whether information of this router is not included in the aggregate of searched routers, if so, finishing the current search, recording the selected LSP and returning to step 12 in which searching for other possible LSP paths of ER1 is continued until all possible LSP paths of ER1 are searched; otherwise, taking the router at the other end of the selected LSP as the current router, recording information of this router in the aggregate of searched routers and executing step 14.

Step 14: selecting an LSP from all the LSPs that takes the current router as the start point, judging whether information of the route at the other end of the selected LSP is included in the aggregate of searched routers, if so, it means that the selected LSP is possible to constitute a loop path, then abandoning the selected LSP and returning to step 14 in which selecting the next LSP and performing judgment is continued; otherwise, executing step 15.

Step 15: judging whether this router is an BR or ER of the current domain, if so, ending the current search and returning to step 12; otherwise, taking this router as the current router, recording information of this router in the aggregate of searched routers and returning to execute step 14 in which searching is continued with this router as the start point until the route at the other end of the searched LSP is an intra-domain BR or ER.

In the same way, according to the above method from step 11 to step 15, an aggregate of LSP paths with ER2, BR1 and BR2 as the entry routers is obtained by the searching.

The aggregate of LSP paths obtained by way of the above method from step 11 to step 15 is stored in a matrix table, as shown in table 3.

TABLE 3

| entry | Exit | | | |
|---|---|---|---|---|
| | ER1 | ER2 | BR1 | BR2 |
| ER1 | — | {(LSP1)} | {(LSP2)} | {(LSP3)} |
| ER2 | {(LSP4)} | — | {(LSP5), (LSP2, LSP4)} | {(LSP3, LSP4)} |
| BR1 | {(LSP6)} | {(LSP7)} | — | |
| BR2 | {(LSP8)} | {(LSP9)} | | — |

In this table, row item and column item respectively represent exit router and entry router inside the domain of bearer network resource manager 1. Entry router table item and exit router table item respectively comprise all ERs or BRs in this management domain, crossing points of rows and columns denote the path aggregate from one ER/BR to another ER/BR. The path aggregate obtained by step 11 to step 15 is filled in corresponding locations in this table, thus path aggregate between entry routers and exit routers is recorded in this table. Path aggregate in this table may have the following status:

① Null. The "-" or space in table 3 means that there is no available path between entry router and exit router.

② There is only one available path. For instance, {(LSP1)} in table 3 means that there is only one optimal path between entry router and exit router; {(LSP3, LSP4)} in table 3 means that this path passes a plurality of intra-domain LSPs.

③ There are multiple paths. For example, {(LSP5), (LSP2, LSP4)} in table 3, as separated by parentheses, means that there are multiple optimal paths between entry router and exit router.

Bearer network resource manager 1 performs intra-domain routing according to the pre-calculated and stored path aggregate in table 3. In the present embodiment, bearer network resource manager 1 is a source bearer network resource manager for the call, so bearer network resource manager 1 firstly finds the entry router ER2 according to IP address of the calling party, and then queries table 3 to discover that LSP path aggregate through which it is possible to reach domain of bearer network resource manager 2 from ER2 comprise: the LSP path from ER2 to BR1: {(LSP5), (LSP2, LSP4)}; the path from ER2 to BR2: {(LSP3, LSP4)}.

In the present embodiment, LSP5 is selected as the intra-domain path of bearer network resource manager 1 according to load sharing or service type, priority, locally configured routing strategy, the current network status and specified QoS requirements. Here, the current network status can comprise resource availability status and the current service flow. In other embodiments utilizing the present routing manner, the above routing procedure can also be performed according to other conditions.

In the present routing manner, Dijakstra algorithm, Bellman-Ford algorithm or static configuration algorithm can also be used to determine intra-domain path aggregate besides the above-described steps.

After the procedure of intra-domain routing in bearer network resource manager 1 is completed by adopting the present routing manner, the inter-domain routing between bearer network resource managers 1 and 2 can also be performed. Certainly, it is also applicable to perform inter-domain routing between bearer network resource managers firstly, and then perform intra-domain routing by adopting the present routing manner according to the entry routers and exit routers determined by routing result.

For this routing scheme of utilizing path matrix, according to practical situation of each bearer network resource manager, intra-domain routing can be performed through the pre-established intra-domain path information, this method has advantages such as high speed, easy implementation, convenient application, easy maintenance and management, and is suitable to be applied in complicated networks.

The Second Manner: Routing Manner by Adopting Exit/Entry Router IP Identifier

This routing manner adopts the Diff-serv model shown in FIG. 1 to implement data transmission over the network. In this model, a bearer control layer route comprises signaling route between bearer network resource managers and service route between CNs. The service route comprises inter-domain route and intra-domain route, while the present routing manner mainly concerns intra-domain route. Core idea of the present method is: establishing and maintaining a route table of reachable paths between intra-domain CNs in a bearer network resource manager, implementing intra-domain routing of each bearer network resource manager in the bearer control layer by using this route table, thus determining the intra-domain service route of each bearer network resource manager. Here, the CN can be ER, BR or other routers such as forwarding routers.

With reference to FIG. 5 again, bearer network resource managers 1 and 2 respectively manage metropolitan networks 1 and 2. Taking the management domain managed by bearer network resource manager 1 as example, there are ER1, ER2, BR1 and BR2 that can be taken as exit routers or entry routers in the management domain of bearer network resource manager 1. Factually, there are other CNs (not shown in FIG. 5) as well as LSPs between them (not shown in FIG. 5) in the management domain of bearer network resource manager 1.

Before the intra-domain service path routing is performed, an aggregate of those LSP paths among each exit router and each entry router is established beforehand inside this domain, and then IP identifiers are set according to IP address segments managed by all intra-domain exit routers and entry routers.

In the present embodiment, this LSP path aggregate is established by means of a route table. Any router of ER1, ER2, BR1 and BR2 that can be taken as entry router is selected as the entry router, and ER1 is selected as entry router in the present embodiment. The procedure of establishing the LSP path aggregate comprises the following steps:

Step 21: setting the IP address segment managed by ER1 in the bearer network resource manager as IP1, and adding information of ER1 to the aggregate of searched routers.

Step 22: selecting an LSP from all the LSPs connected to ER1.

Step 23: judging whether the router at the other end of the selected LSP is an intra-domain BR or ER and whether information of this router is not included in the aggregate of searched routers, if so, finishing the current search, recording the selected LSP and returning to step 22 in which searching for other possible LSP paths of ER1 is continued until all possible LSP paths of ER1 are searched; otherwise, taking the router at the other end of the selected LSP as the current router, recording information of this router in the aggregate of searched routers and executing step 24.

Step 24: selecting an LSP from all the LSPs that takes the current router as the start point, judging whether information of the route at the other end of the selected LSP is included in the aggregate of searched routers, if so, it means that the selected LSP is possible to constitute a loop path, then abandoning the selected LSP and returning to step 24 in which selecting the next LSP and performing judgment is continued; otherwise, executing step 25.

Step 15: judging whether this router is an BR or ER of the current domain, if so, ending the current search and returning to step 22; otherwise, taking this router as the current router, recording information of this router in the aggregate of searched routers and returning to execute step 24 in which searching is continued with this router as the start point until the route at the other end of the searched LSP is an intra-domain BR or ER.

In the current routing manner, Dijakstra algorithm, Bellman-Ford algorithm or static configuration algorithm can also be used to obtain intra-domain LSP path aggregate of the bearer network resource manager besides the above-described steps.

According to the above-mentioned method for establishing LSP path aggregate, ER2, BR1 and BR2 are taken as entry routers respectively, address segments managed by ER2, BR1 and BR2 are respectively set as IP2, IP3 and IP4, and all LSPs of ER2, BR1 and BR2 are searched.

The IP address segments managed by bearer network resource manager are allocated to ER1, ER2, BR1 and BR2 in this bearer network resource manager. Identifier IP1 is allocated for ER1, IP2 for ER2, IP3 for BR1 and IP4 for BR2. IP address segment table in the management domain of bearer network resource manager is established, as shown in table 4.

TABLE 4

| Identifier | IP address segment |
| --- | --- |
| IP1 | 10.1.0.1~10.1.255.255 |
| IP2 | 10.2.0.1~10.2.255.255 |

TABLE 4-continued

| Identifier | IP address segment |
|---|---|
| IP3 | 10.3.0.1~10.3.255.255 |
| IP4 | 10.4.0.1~10.4.255.255 |

In table 4, the IP address segment of 10.1.0.1~10.1.255.255 is allocated for IP1, that of 10.2.0.1~10.2.255.255 for IP2, 10.3.0.1~10.3.255.255 for IP3 and 10.4.0.1~10.4.255.255 for IP4. In this way, a service stream with an IP address can find IP identifier of exit router and that of entry router inside management domain of bearer network resource manager.

In the present routing manner, an intra-domain LSP table of bearer network resource manager is set according to relationship between the established LSP path aggregate and IP, as shown in table 5:

TABLE 5

| Entry | exit | | | |
|---|---|---|---|---|
|  | IP1 | IP2 | IP3 | IP4 |
| IP1 | — | {(LSP1)} | {(LSP2)} | {(LSP3)} |
| IP2 | {(LSP4)} | — | {(LSP5), (LSP2, LSP4)} | {(LSP3, LSP4)} |
| IP3 | {(LSP6)} | {(LSP7)} | — |  |
| IP4 | {(LSP8)} | {(LSP9)} |  | — |

In table 5, IP addresses of exit router and entry router are both represented by IP identifiers, namely that column table item represents intra-domain entry IP identifier of the bearer network resource manager, and row table item represents intra-domain exit IP identifier of the bearer network resource manager, the desired LSP can be found at cross point of the table according to exit IP identifier and entry IP identifier of this service stream.

When two LSPs are found based on table 5 according to exit IP identifier and entry IP identifier of this service stream, for example, exit IP identifier and entry IP identifier of this service stream are respectively IP3 and IP2, then it is obtained from table 5 that, this service stream can select LSP5 route or (LSP2, LSP4) route. This routing manner can select LSP according to load sharing, service type, resource availability, priority, locally configured routing strategy, or certain specified QoS requirements and so on. For instance, LSP5 is selected as intra-domain route path of the bearer network resource manager.

A specific example will be taken to describe the routing procedure by utilizing the above-noted table 4 and table 5 in the present routing manner.

Supposing that a calling user sends a request for sending a service stream to a bearer network resource manager via a CA, and that IP address of the calling user is 10.2.0.0, then the procedure of intra-domain routing in the bearer network resource manager is as follows:

Step 210: obtaining entry IP identifier of the current service stream as IP2 by looking up table 4 according to IP address of the calling user.

Step 220: setting IP address of exit router for transmitting the current service stream, and looking up table 4 according to this IP address to obtain exit IP identifier for transmitting the current service stream, supposing the obtained exit IP identifier is IP1.

Step 230: looking up table 5 according to entry IP identifier and exit IP identifier of the current service stream, obtaining the route path for the current service stream, which is LSP4, thus the current service stream is transmitted through LSP4 in management domain of bearer network resource manager.

In the present routing manner, LSP is not determined directly according to entry router and exit router of the service stream to be transmitted, but according to IP identifiers. In this way, it is flexible to set corresponding relationship between IP address segment and ER or BR in bearer network resource manager, thus there is no need to exactly know entry router and exit router of the service stream, instead, knowing entry IP address and exit IP address of the service stream is enough.

When establishing table 5, each IP address segment managed by bearer network resource manager can correspond to a certain ER or BR, or correspond to multiple BRs or ERs. In the same way, each BR or ER can correspond to multiple IP address segments. But different correspondence manners lead to different LSPs in table 5.

Because it is required in the current routing manner to calculate all LSPs among CNs inside management domain of bearer network resource manager, when a network has a large scale, the scale of table 4 and table 5 may be very large, thus it is not convenient to look up the tables. So this routing manner is suitable to apply in networks with not very large scale.

In this kind of routing scheme by utilizing IP identifier of exit/entry router, IP address segments managed by management domain of bearer network resource manager are allocated to all exit routers and entry routers inside management domain of this bearer network resource manager and are set with IP identifiers, and then an intra-domain route table of the bearer network resource manager is set according to all exit IP identifiers, entry IP identifiers and LSPs. When processing a connection resource request, an LSP is selected according to the intra-domain route table of bearer network resource manager, so that intra-domain routing of each bearer network resource manager in bearer control layer is implemented, with easy implementation and convenient maintenance and management.

The Third Manner: Routing Manner According to a Resource Constraint Condition

This method adopts the Diff-serv model shown in FIG. 1 to implement data transmission over a network. In this model, bearer control layer route comprises signaling route between bearer network resource managers and service route between CNs, the service route comprising inter-domain route and intra-domain route. When processing the user's service bandwidth application, bearer control layer will determine the user's service path, and bearer network resource manager will notify ER to forward service stream according to the specified service path. Method of this routing manner can be applied to service route and signaling route. However, since inter-domain network topology is usually simple, to perform resource constraint upon signaling route is not necessary and it will increase management maintenance cost of the network, embodiment of this routing manner only illustrates service route routing, i.e. intra-domain routing. Here, the above-noted CN may be ER, BR or other routers such as forwarding routers.

Figure 22:
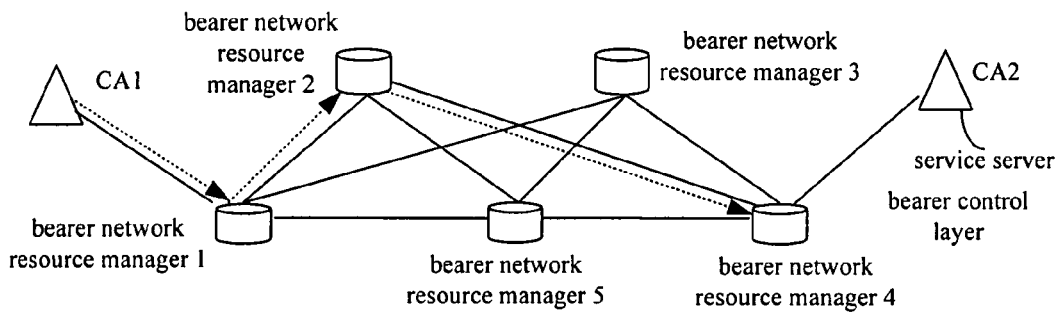
FIG. 22 is a schematic diagram illustrating a bearer control layer in a service route selection manner according to the present invention.

As shown in FIG. 22, in embodiment of the present routing manner, a route path of "CA1→bearer network resource manager 1→bearer network resource manager 2→bearer network resource manager 4" is needed to be established. In FIG. 22, the dotted line represents a connection resource request establishment path with a 10 M bandwidth as service requirement.

Figure 23:
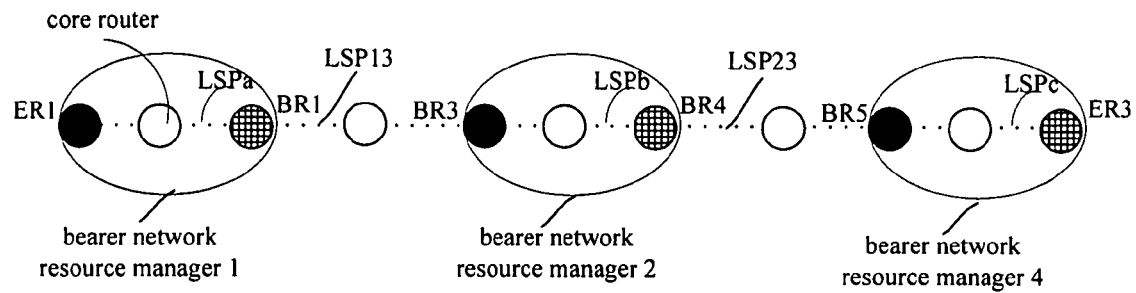
FIG. 23 illustrates a procedure of establishing an LSP in a bearer network under the condition shown in FIG. 22.

With reference to FIG. 23, the procedure of establishing this route path in an embodiment of this routing manner comprises the following steps.

In step 31, according to a call request from a CA, bearer network resource manager 1 determines ER1 as calling end office router or tandem office router. According to this determined entry router, bearer network resource manager 1 determines an intra-domain LSP based on the 10 M bandwidth requirements. The specific procedure of bearer network resource manager 1 determining an intra-domain LSP is as follows.

As shown in table 6, information of all intra-domain paths is stored in bearer network resource manager 1 beforehand. From contents in this table, bearer network resource manager 1 obtains three LSPs with ER1 as the calling end office router: LSP1, LSPa and LSP3. The three LSPs are respectively configured with a resource constraint condition beforehand, and the resource constraint condition in this embodiment of routing manner refers to bandwidth requirements. In detail, total bandwidth of LSP1 is 50000 M, and maximum allowable bandwidth for each stream is 50 M; total bandwidth of LSPa is 10000 M, and maximum allowable bandwidth for each stream is 10 M; total bandwidth of LSP3 is 1000 M, and maximum allowable bandwidth for each stream is 1 M. Since maximum allowable bandwidth for each stream of LSPa is 10 M, which is equivalent to the 10 M service bandwidth requirement, bearer network resource manager selects LSPa as the intra-domain path in bearer network resource manager 1. Among the above three selectable LSPs, maximum allowable bandwidth for each stream of LSP1 is 50 M, which is enough to satisfy the 10 M service bandwidth requirement, but in terms of resource saving, network resources will be wasted if LSP1 is adopted. Therefore, LSPa is selected as the intra-domain path in bearer network resource manager 1 in the embodiment of the present routing manner. In addition, the current network status can also be taken into consideration during the routing procedure. If bandwidth of LSPa is almost totally allocated while there is still idle resources on LSP1, LSP1 can be selected then.

In a word, during the routing procedure according to a resource constrain condition, it may be acceptable that the resource constrain condition is no less than the service requirement. When there are a plurality of available LSPs, other conditions including resource consumption may be taken into consideration to select an optimal LSP.

After selecting LSPa as the intra-domain path in bearer network resource manager 1, BR1 is determined as the exit router of bearer network resource manager 1 according to content in table 6.

TABLE 6

| entry | Exit | | | |
| --- | --- | --- | --- | --- |
| | ER1 | ER2 | BR1 | BR2 |
| ER1 | — | {(LSP1)} | {(LSPa)} | {(LSP3)} |
| ER2 | {(LSP4)} | — | {(LSP5), (LSP2, LSP4)} | {(LSP3, LSP4)} |
| BR1 | {(LSP6)} | {(LSP7)} | — | |
| BR2 | {(LSP8)} | {(LSP9)} | | — |

In table 6, row item and column item respectively represent exit router and entry router inside the domain of bearer network resource manager 1. Entry router table item and exit router table item respectively comprise all ERs or BRs in this management domain, crossing points of rows and columns denote the path aggregate from one ER/BR to another ER/BR. Path aggregate in this table may have the following status:

① Null. The "-" or space in table 6 means that there is no available path between entry router and exit router.

② There is only one available path. For instance, {(LSP1)} in table 6 means that there is only one optimal path between entry router and exit router; {(LSP3, LSP4)} in table 6 means that this path passes a plurality of intra-domain LSPs.

③ There are multiple paths. For example, {(LSP5), (LSP2, LSP4)} in table 6, as separated by parentheses, means that there are multiple optimal paths between entry router and exit router.

In step 32, according to the preset inter-domain LSP bandwidth requirement, bearer network resource manager 1 or 2 selects an LSP meeting the requirement from all the inter-domain LSPs between bearer network resource managers 1 and 2.

In detail, since BR1 has already been determined as the exit router of bearer network resource manager 1 in step 31, in the present step, all inter-domain LSPs with BR1 as the start point are listed. Bandwidth requirements of these LSPs are obtained, and one LSP is selected from these LSPs according to the 10 M bandwidth requirement, and entry router of bearer network resource manager 2 is determined according to end point of the selected LSP. Here, LSP13 is selected as the inter-domain LSP between bearer network resource managers 1 and 2, and BR3 is determined as entry router of bearer network resource manager 2.

In step 33, according to the service bandwidth requirement, bearer network resource manager 2 selects an LSP meeting the service bandwidth requirement from all intra-domain LSPs of bearer network resource manager 2, and exit router of bearer network resource manager 2 is determined based on the selected LSP. The method for selecting an LSP in the present step is similar to that in step 31, and the determined intra-domain LSP of bearer network resource manager 2 is LSPb, and BR4 is determined as exit router of bearer network resource manager 2 based on LSPb.

In step 34, by adopting the method similar to that in step 32, LSP23 is determined as the inter-domain LSP between bearer network resource managers 2 and 4, and BR5 is determined as entry router of bearer network resource manager 4 based on LSP23. And then by adopting the method similar to that in step 31, bearer network resource manager 4 determines intra-domain LSP of bearer network resource manager 4 as LSPc and exit router of bearer network resource manager 4 as ER3.

In the present embodiment, the LSP bandwidth requirement information is stored in each bearer network resource manager. In other embodiments of the present routing manner, a dedicated database can be established to store the LSP bandwidth requirement information.

In the present embodiment, if it is detected during the routing procedure that none of the selectable LSP can meet the service bandwidth requirement, the current ER or BR will report a resource rejection response to upstream ER or BR, the resource rejection response including routing failure information. Then the bearer network resource manager that manages upstream ER or BR reports a rejection response of connection resource request to the previous hop bearer network resource manager or CA, thereby this connection resource request is rejected.

According to the above-described method, a route path "CA1→bearer network resource manager 1→bearer network resource manager 2→bearer network resource manager 4" that meets the service bandwidth requirement can be established. In other embodiments of the current routing manner, service bandwidth requirement can be taken into consideration when performing intra-domain routing or inter-domain routing. Moreover, other service requirements can also be taken as resource constraint conditions for the routing, for instance, resource constraint condition may be a rule restriction upon LSP, the rule specifying which streams are allowed to pass this LSP and which are not allowed to.

By adopting the present method, network service provider can select a special path for a user with relevant service requirements to implement this service, so as to charge this user according to this user's service requirements. When making network plans, service providers can estimate the future flow and constrain the LSP accordingly so as to satisfy service and performance requirements.

Therefore, the present method can implement the routing based on resource constraint in terms of service request, so as to select a path meeting the bandwidth requirement, so that the desirable quality of service can be reached after the user's call is accepted. Furthermore, the service provider can set charging criteria according to the preset resource constraint condition in order to implement classified charging and obtain better economic performance. This method is easy to implement, maintain and manage.

The Fourth Manner: A Routing Manner According to a Set Routing Strategy

This method adopts the Diff-serv model shown in FIG. 1 to implement data transmission over a network. In this model, bearer control layer route comprises signaling route between bearer network resource managers and service route between CNs, the service route comprising inter-domain route and intra-domain route. The strategy routing method of this routing manner can be applied on both service route and signaling route. Here, the above-noted CN may be ER, BR or other routers such as forwarding routers.

With reference to FIG. 22, in an embodiment of the present routing manner, a route path from CA1 to bearer network resource manager 4 needs to be established, as shown in FIG. 22, there are five signaling route paths from CA1 to bearer network resource manager 4:

Path 1: CA1→bearer network resource manager 1→bearer network resource manager 2→bearer network resource manager 4;

Path 2: CA1→bearer network resource manager 1→bearer network resource manager 3→bearer network resource manager 4;

Path 3: CA1→bearer network resource manager 1→bearer network resource manager 5→bearer network resource manager 4;

Path 4: CA1→bearer network resource manager 1→bearer network resource manager 2→bearer network resource manager 5→bearer network resource manager 4;

Path 5: CA1→bearer network resource manager 1→bearer network resource manager 3→bearer network resource manager 5→bearer network resource manager 4.

In the present embodiment, each bearer network resource manager stores strategy routing information and performs strategy routing among the above-noted five signaling route paths according to the stored strategy routing information. The specific procedure is as follows.

In step 41, first of all, each bearer network resource manager performs routing according to bandwidth resource status. In this embodiment of the present routing manner, signaling route paths 1, 2, 3 and 4 have sufficient bandwidth resources while signaling route path 5 has little bandwidth resources. Therefore, signaling route paths 1, 2, 3 and 4 are selected as candidate paths.

In step 42, each bearer network resource manager performs routing according to priority of the service request. In this embodiment of the present routing manner, the service has high priority. Since the above-noted signaling route paths 1, 2 and 3 satisfy the requirement of high priority while signaling route paths 4 and 5 do not satisfy the requirement, signaling route paths 1, 2 and 3 are selected as candidate paths from the above-mentioned signaling route paths 1, 2, 3 and 4 selected in step A.

In step 43, the routing is performed according to the current service flow of each path in the network. In this embodiment of the present routing manner, signaling route paths 2 and 5 have large service flow at present while signaling route paths 1, 3 and 4 have relatively small service flow. Therefore, signaling route paths 1 and 3 are further selected as candidate paths that accord with the current service flow status from the candidate signaling route paths 1, 2 and 3 in step B.

In step 44, the routing is performed according to IP address of the called user. In this embodiment of the present routing manner, the routing strategy prescribes that service to IP address of this called user should be transmitted through path 3. Therefore, path 3 is further selected from the candidate paths 1 and 3 in step C.

Thus the signaling route path is determined as: CA1→bearer network resource manager 1→bearer network resource manager 5→bearer network resource manager 4.

The above description is just one embodiment of implementing signaling route by utilizing bearer network resource manager, and other kinds of strategies can also be adopted to implement routing in other embodiments of the present routing manner, such as the number of hops of a route path or IP address of the calling user. Moreover, as described in the above embodiment, routing with a manner of elimination through selection can be performed by adopting multiple strategies in a certain sequence, or the routing can be performed by adopting each strategy respectively and then a relatively optimal path is selected from all the selected paths. There are multiple routing strategies in this embodiment of the present routing manner, but there can also be only one routing strategy in other embodiments of the present routing manner.

Figure 24:
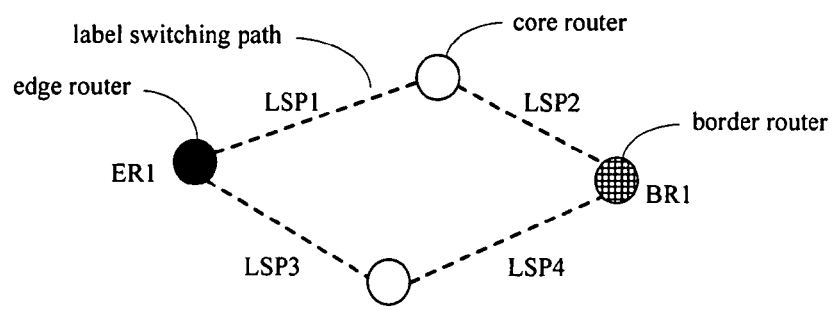
FIG. 24 is a schematic diagram illustrating an intra-domain path in another service routing manner according to the present invention.

In the present routing manner, while performing service route routing, each bearer network resource manager can also perform intra-domain or inter-domain routing by utilizing routing strategies. Taking bearer network resource manager 1 performing intra-domain routing as example, with reference to FIG. 24, procedure of implementing this intra-domain strategic routing in the present embodiment is as follows.

It is determined in advance that entry router and exit router of the service in bearer network resource manager 1 are ER1 and BR1 respectively, and a path information matrix table is stored in bearer network resource manager 1 in advance. By looking up this matrix table, it is determined that there are two LSPs with ER1 as entry router and BR1 as exit router, which are LSP1+LSP2 and LSP3+LSP4.

TABLE 7

| entry | exit | | | |
| --- | --- | --- | --- | --- |
|  | ER1 | ER2 | BR1 | BR2 |
| ER1 | — | {(LSP1)} | {(LSP1, LSP2), (LSP3, LSP4)} | {(LSP3)} |
| ER2 | {(LSP4)} | — | {(LSP5), (LSP3, LSP4)} | {(LSP2, LSP4)} |

TABLE 7-continued

| | | exit | | |
|---|---|---|---|---|
| entry | ER1 | ER2 | BR1 | BR2 |
| BR1 | {(LSP6)} | {(LSP7)} | — | |
| BR2 | {(LSP8)} | {(LSP9)} | | — |

In table 7, row item and column item respectively represent exit router and entry router inside the domain of bearer network resource manager 1. Entry router table item and exit router table item respectively comprise all ERs or BRs in this management domain, crossing points of rows and columns denote the path aggregate from one ER/BR to another ER/BR. Path aggregate in this table may have the following status:

① Null. The "-" or space in table 7 means that there is no available path between entry router and exit router.

② There is only one available path. For instance, {(LSP1)} in table 7 means that there is only one optimal path between entry router and exit router; {(LSP2, LSP4)} in table 7 means that this path passes a plurality of intra-domain LSPs.

③ There are multiple paths. For example, {(LSP5), (LSP3, LSP4)} in table 7, as separated by parentheses, means that there are multiple optimal paths between entry router and exit router.

Since the following strategy is preset in bearer network resource manager 1: selecting "LSP1+LSP2" for the service stream with 10.10.1.0/24 as the destination IP address of the route information in ER1 of bearer network resource manager 1, bearer network resource manager 1 will select "LSP1+LSP2" as the intra-domain path according to this strategy, thereby determine exit router of bearer network resource manager 1 is BR1. Bearer network resource manager 1 determines a path of "ER1→LSP1→LSP2→BR1" accordingly. In the present embodiment, bearer network resource manager 1 performs routing according to destination address, while in other embodiments of the present routing manner, bearer network resource manager 1 can also perform the strategic routing according to priority, current service flow, bandwidth resource status and other factors, and the routing method is the same as the above.

In the present embodiment, intra-domain strategic routing manner of other bearer network resource managers are the same as that of bearer network resource manager 1, while strategies of the bearer network resource managers can be either the same or different, which does not affect implementation of this routing manner.

In the present routing manner, each bearer network resource manager can performs inter-domain routing for service route by utilizing strategic routing, and the specific inter-domain routing method is similar with intra-domain routing method.

In the above-described strategic routing procedure, if none of the route paths can satisfy strategic routing requirement, a connection rejection response will be reported to upstream bearer network resource manager, wherein routing failure information is comprised in this connection rejection response. This bearer network resource manager reports the connection rejection response message to the previous hop bearer network resource manager or CA, so that this connection resource request is rejected.

In other embodiments of the present routing manner, other types of strategies can also be adopted for the routing, for instance: the routing strategy can be rule constrain upon intra-domain LSP, wherein this rule constrain comprises: which streams are allowed to pass through this LSP and which are not, and so on.

In the embodiment of the present routing manner, the strategy information adopted for routing is stored in each bearer network resource manager, while in other embodiments of the present routing manner, the strategy information adopted for routing can also be stored in a dedicated strategy database which can be looked up by all bearer network resource managers.

By adopting the method of the present routing manner, network service providers can select specified paths by means of strategic routing to implement the user's corresponding services, so as to charge the user according to this user's service requirements. Moreover, the user's prepaid status for the service can be taken as a routing strategy and taken into routing consideration. When making network plans, service providers should make good network plans so as to guarantee that sufficient resources can be provided for users.

Therefore, the present method can implement routing based on strategies in terms of service request so as to select a path meeting the bandwidth requirement, thus desirable quality of service can be guaranteed after the user's call is accepted. Furthermore, the service provider can set charging criteria according to the preset resource constraint condition in order to implement classified charging and obtain better economic performance. This method is easy to implement, maintain and manage.

It should be noted that the foregoing description is a demonstration of the rather than limitation to the present invention.

The invention claimed is:

1. A method for selecting a real-time service data transmission path based on label switching, applied to an independent bearer control layer comprising more than one bearer network resource manager which is established between a service control layer and a bearer network, each of the more than one bearer network resource manager corresponding to one domain, and when a source bearer network resource manager receives a connection resource request for a real-time service from the service control layer, the method comprising:

from the source bearer network resource manager to a destination bearer network resource manager hop by hop, determining, by each source bearer network resource manager except the destination bearer network resource manager, an inter-domain label switching path (LSP) between a local domain and a next-hop domain, and sending a connection resource request to a next hop bearer network resource manager; and, from the destination bearer network resource manager to the source bearer network resource manager hop by hop, sending, by each bearer network resource manager except the source bearer network resource manager, the determined inter-domain LSP and an intra-domain LSP of the local domain in a connection resource response to a previous hop bearer network resource manager;

receiving, by the source bearer network resource manager, the connection resource response, obtaining a whole LSP aggregate for the connection resource request, which is from the source bearer network resource manager to the destination bearer network resource manager.

2. The method according to claim 1, wherein, each bearer network resource manager has an Internet Protocol (IP) address, a calling party and a called party of the real-time service is identified by IP addresses, and the bearer network resource manager selects the LSP based on the IP addresses.

3. The method according to claim 1, further comprising: transmitting, by the source bearer network resource manager, the whole LSP aggregate to an ingress of a stream of the real-time service in the bearer network.

4. The method according to claim 1, further comprising:
after receiving the connection resource request, determining, by each bearer network resource manager, the intra-domain LSP of the local domain.

5. The method according to claim 1, further comprising:
determining, by the destination bearer network resource manager, the intra-domain LSP after receiving the connection resource request; and,
determining, by each bearer network resource manager except the destination bearer network resource manager, the intra-domain LSP after receiving the connection resource response.

6. The method according to claim 1, further comprising: the bearer network resource manager selecting the LSP according to routing strategy.

7. The method according to claim 1, wherein the selecting of the intra-domain LSP comprises:
pre-calculating a set of LSP paths between all Border Routers (BRs) and Egress Routers (ERs) in the local domain, establishing an intra-domain routing table, and querying the intra-domain routing table to obtain the intra-domain LSP according to an ingress router and an egress router of the local domain; or,
selecting the intra-domain LSP hop by hop until an egress router of the LSP currently selected is a BR or ER in the local domain, and obtaining the intra-domain LSP comprising at least one LSP; or,
selecting the intra-domain LSP within each domain by a matrix intra-domain route algorithm; or,
selecting the intra-domain LSP according to a preconfigured resource constraint condition or routing strategy; or,
selecting the intra-domain LSP within each domain according to a path aggregate including all entry IP address identifiers and exit IP address identifiers inside a management domain of the bearer network resource manager.

8. The method according to claim 1, wherein, the connection resource request comprises current network status and Quality of Service (QoS).

9. The method according to claim 7, wherein the selecting the intra-domain LSP of each domain by a matrix intra-domain route algorithm, comprises:
calculating at least one set of LSPs between all the BRs and ERs in the local domain;
storing the at least one set of LSPs in a matrix table, wherein, in the matrix table, a row item is an ingress Connection Node (CN) identifier, a column item is an egress CN identifier, one pair of one row item and one column item corresponds to one of the at least one set of LSPs wherein the one of the at least one set of LSPs comprises all the LSPs from one ingress CN to one egress CN, the one ingress CN is identified by the corresponding row item, and the one egress CN is identified by the corresponding column item; or, a row item is an egress CN identifier, a column item is an ingress CN identifier, one pair of one row item and one column item corresponds to one of the at least one set of LSPs wherein the one of the at least one set of LSPs comprises all the LSPs from one ingress CN to one egress CN, the one egress CN is identified by the corresponding row item, and the one ingress CN is identified by the corresponding column item;
querying the matrix table according to the current ingress router of the local domain to obtain one set of LSPs in the local domain; and
selecting one LSP as the intra-domain LSP from the obtained set of LSPs in the local domain according to the routing strategy, the status of the existing network and certain QoS requirements.

10. The method according to claim 7, wherein the selecting the intra-domain LSP of each domain by a matrix intra-domain route algorithm comprises:
calculating at least one set of LSPs between all the BRs and ERs in the local domain;
allocating IP address segments for the BRs and the ERs respectively;
storing the at least one set of LSPs in a matrix table, in the matrix table, a row item is the IP address segment of an ingress CN, a column item is the IP address segment of an egress CN, one pair of one row item and one column item corresponds to one of the at least one set of LSPs wherein the one of the at least one set of LSPs comprises all the LSPs from one ingress CN to one egress CN, the one ingress CN is identified by the corresponding row item, and the one egress CN is identified by the corresponding column item; or, a row item is the IP address segment of the egress CN, a column item is the IP address segment of the ingress CN, one pair of one row item and one column item corresponds to one of the at least one set of LSPs wherein the one of the at least one set of LSPs comprises all the LSPs from one ingress CN to one egress CN, the one egress CN is identified by the corresponding row item, and the one ingress CN is identified by the corresponding column item;
querying the matrix table according to the IP address segment of the ingress CN of the local domain to obtain one set of LSPs in the local domain; and
selecting one LSP as the intra-domain LSP from the obtained set of LSPs in the local domain according to the routing strategy, the status of the existing network and certain QoS requirements.

11. The method according to claim 1, wherein each bearer network resource manager has an area code of E.164 number, a calling party and a called party of the real-time service is identified by IP addresses, E.164 numbers or self-defined numbers, and the bearer network resource manager selects the inter-domain LSP based on the area code of E.164 number and selects the intra-domain LSP based on the IP addresses.

12. The method according to claim 1, wherein, the bearer network resource manager selects the intra-domain LSP according to intra-domain routing information, and the intra-domain routing information is configured statically in the bearer network resource manager or a database, or is dynamically obtained by the bearer network resource manager upon receiving the connection resource request.

13. The method according to claim 1, wherein, the connection resource request comprises a service type and Quality of Service, QoS, parameters, and
the method further comprises:
the bearer network resource manager selecting the LSP according to the service type and the QoS, parameters carried in the connection resource request.

14. The method according to claim 13, further comprising: the bearer network resource manager selecting the LSP according to a routing strategy.

15. The method according to claim 14, wherein the selecting the LSP according to the routing strategy comprises:

selecting the LSP by using a load sharing principle, by using a polling manner or according to priorities configured for service requirements.

16. The method according to claim 1, wherein the selecting the intra-domain LSP comprises:
   1) searching out an entry Connection Node (CN) in the local domain according to the connection resource request, and adding the information of an entry CN to an aggregate of searched CN;
   2) selecting one intra-domain LSP according to the entry CN, determining whether an exit CN of the selected intra-domain LSP is an Edge Router (ER) or a Border Router (BR) in the local domain, if it is the ER or the BR, completing selecting the intra-domain LSP, and otherwise, performing Step 3);
   3) determining whether the information of the exit CN of the intra-domain LSP currently selected has been added to the aggregate of searched CN, if it has been added to the aggregate of searched CN, abandoning the intra-domain LSP currently selected and returning to Step 2); and otherwise adding to the aggregate of searched CN the information of the exit CN of the intra-domain LSP currently selected, and taking the exit CN of the intra-domain LSP currently selected as the entry CN to perform Step 2).

17. The method according to claim 1, when a source user and a destination user belong to different independent operation networks, further comprising:
   pre-configuring a virtual destination user having an address segment of the destination user in the bearer network resource manager for managing a border router in the independent operation network to which the source user belongs;
   bonding the virtual destination user with the border router in the independent operation network to which the source user belongs, the border router being connected to a gateway of the independent operation network to which the destination user belongs;
   when receiving the connection resource request, further comprising:
      determining, by the bearer network resource manager for managing the border router in the independent operation network to which the source user belongs, the border router bounded to the virtual destination user according to an address of the destination user carried in the connection resource request;
      determining, by the bearer network resource manager for managing the border router in the independent operation network to which the source user belongs, the route from the source user to the virtual destination user; and
      determining, by the gateway of the independent operation network to which the destination user belongs, the route to the destination user.

18. A bearer network resource manager residing on a physical network for selecting a real-time service data transmission path based on label switching, applied to an independent bearer control layer comprising more than one bearer network resource manager which is established between a service control layer and a bearer network, each of the more than one bearer network resource manager corresponding to one domain, the bearer network resource manager comprising a processor coupled to memory and adapted for:
   receiving a connection resource request for a real-time service from the service control layer;
   when being not a destination bearer network resource manager, determining an inter-domain label switching path LSP between a local domain and a next-hop domain;
   when being not a source bearer network resource manager, sending the inter-domain LSP and an intra-domain LSP of the local domain to a previous hop bearer network resource manager, which is carried in a connection resource response; and,
   when being the source bearer network resource manager, obtaining a whole LSP aggregate for the connection resource request, which is from the source bearer network resource manager to the destination bearer network resource manager.

19. The bearer network resource manager according to claim 18, being further adapted for when being the source bearer network resource manager, transmitting the whole LSP aggregate to an ingress of the stream of the real-time service in the bearer network.

20. The bearer network resource manager according to claim 18, being further adapted for selecting the LSP according to a routing strategy.

21. The bearer network resource manager according to claim 18, being further adapted for using following mode to select the intra-domain LSP:
   pre-calculating a set of LSP paths between all BRs and ERs in the local domain, establishing an intra-domain routing table, and querying the intra-domain routing table to obtain the intra-domain LSP according to an ingress router and an egress router of the local domain; or,
   selecting the intra-domain LSP hop by hop until an egress router of the LSP currently selected is a BR or ER in the local domain, and obtaining the intra-domain LSP comprising at least one LSP; or,
   selecting the intra-domain LSP of the local domain by a matrix intra-domain route algorithm; or,
   selecting the intra-domain LSP according to a preconfigured resource constraint condition or routing strategy; or,
   selecting the intra-domain LSP of the local domain according to a path aggregate including all entry IP address identifiers and exit IP address identifiers inside a management domain of the bearer network resource manager.

22. The bearer network resource manager according to claim 18, wherein, when the bearer network resource manager is not the source bearer network resource manager, the intra-domain LSP of the local domain in the connection resource response that is sent to the previous hop bearer network resource manager is determined by the bearer network resource manager after receiving the connection resource request.

23. The bearer network resource manager according to claim 18, wherein, when the bearer network resource manager is neither the source bearer network resource manager nor the destination bearer network resource manager, the intra-domain LSP of the local domain in the connection resource response that is sent to the previous hop bearer network resource manager is determined by the bearer network resource manager after receiving the connection resource response; and,
   when the bearer network resource manager is the destination bearer network resource manager, the intra-domain LSP of the local domain in the connection resource response that is sent to the previous hop bearer network resource manager is determined by the bearer network resource manager after receiving the connection resource request.

24. A system for selecting a real-time service data transmission path based on label switching, the system comprising:
- an independent bearer control layer comprising more than one bearer network resource manager residing on a physical network which is established between a service control layer and a bearer network, each of the more than one bearer network resource manager corresponding to one domain, and when a source bearer network resource manager receives a connection resource request for a real-time service from the service control layer,
- from the source bearer network resource manager to a destination bearer network resource manager hop by hop, each bearer network resource manager comprising a processor coupled to memory and, except the destination bearer network resource manager, being adapted for determining an inter-domain label switching path (LSP) between a local domain and a next-hop domain, and sending a connection resource request to a next hop bearer network resource manager;
- from the destination bearer network resource manager to the source bearer network resource manager hop by hop, each bearer network resource manager comprising a processor coupled to memory and, except the source bearer network resource manager, being adapted for sending the determined inter-domain LSP and an intra-domain LSP of the local domain in a connection resource response to a previous hop bearer network resource manager; and,
- the source bearer network resource manager, being further adapted for receiving the connection resource response, and obtaining a whole LSP aggregate for the connection resource request, which is from the source bearer network resource manager to the destination bearer network resource manager.

25. The system according to claim 24, the source bearer network resource manager, being further adapted for transmitting the whole LSP aggregate to an ingress of a stream of the real-time service in the bearer network.

26. The system according to claim 24, when the bearer network resource manager is not the source bearer network resource manager, the intra-domain LSP of the local domain in the connection resource response that is sent to the previous hop bearer network resource manager being determined by the bearer network resource manager after receiving the connection resource request.

27. The system according to claim 24, when the bearer network resource manager is neither the source bearer network resource manager nor the destination bearer network resource manager, the intra-domain LSP of the local domain in the connection resource response that is sent to the previous hop bearer network resource manager being determined by the bearer network resource manager after receiving the connection resource response; and,
when the bearer network resource manager is the destination bearer network resource manager, the intra-domain LSP of the local domain in the connection resource response that is sent to the previous hop bearer network resource manager being determined by the bearer network resource manager after receiving the connection resource request.

* * * * *